(12) United States Patent
Segal et al.

(10) Patent No.: US 9,852,764 B2
(45) Date of Patent: Dec. 26, 2017

(54) SYSTEM AND METHOD FOR PROVIDING AND INTERACTING WITH COORDINATED PRESENTATIONS

(71) Applicant: Touchcast LLC, New York, NY (US)

(72) Inventors: Edo Segal, New York, NY (US); Dmytro Panin, Zaporozhye (UA)

(73) Assignee: Touchcast LLC, New York, NY (US)

( * ) Notice: Subject to any disclaimer, the term of this patent is extended or adjusted under 35 U.S.C. 154(b) by 0 days.

(21) Appl. No.: 15/608,932

(22) Filed: May 30, 2017

(65) Prior Publication Data

US 2017/0330596 A1    Nov. 16, 2017

Related U.S. Application Data

(63) Continuation-in-part of application No. 14/813,974, filed on Jul. 30, 2015, now Pat. No. 9,666,231, and a continuation-in-part of application No. 14/316,536, filed on Jun. 26, 2014, now Pat. No. 9,363,448, application No. 15/608,932, which is a continuation-in-part of application No. 15/247,534, filed on Aug. 25, 2016, and a continuation-in-part of application No. 14/833,984, filed on Aug. 24, 2015, now Pat. No. 9,661,256, which is a continuation-in-part of application No. 14/316,536.

(60) Provisional application No. 62/031,114, filed on Jul. 30, 2014, provisional application No. 62/209,727, filed on Aug. 25, 2015, provisional application No. 62/242,029, filed on Oct. 15, 2015, provisional application No. 62/329,081, filed on Apr. 28, 2016, provisional application No. 61/839,757, filed on Jun.

(Continued)

(51) Int. Cl.
*G11B 27/031* (2006.01)

(52) U.S. Cl.
CPC .................................. *G11B 27/031* (2013.01)

(58) Field of Classification Search
None
See application file for complete search history.

(56) References Cited

U.S. PATENT DOCUMENTS

| | | |
|---|---|---|
| 7,577,978 B1 | 8/2009 | Wistendahl et al. |
| 8,508,614 B2 | 8/2013 | Segal |
| 8,584,164 B2 | 11/2013 | Walter et al. |

(Continued)

FOREIGN PATENT DOCUMENTS

| WO | WO 2010/141939 | 12/2010 |
|---|---|---|
| WO | WO 2012/139082 | 10/2012 |
| WO | WO 2013/076478 | 5/2013 |

*Primary Examiner* — Eileen Adams
(74) *Attorney, Agent, or Firm* — Leason Ellis LLP

(57) ABSTRACT

Disclosed is a system and method for generating a coordinated presentation. Content selected by a user is curated, and a plurality of images are captured for inclusion. A first data stream for the curated content and a second data stream for the captured images are received. A portion of a subject within each second data stream image is defined. An appearance of movement is tracked, and at least some of the plurality of images in the second data stream is modified. The respective content associated with the two data streams is integrated, including the modified at least some of the plurality of images, to generate the coordinated presentation that is capable of transmission to and receipt by one or more remote devices, and wherein the coordinated presentation is configured to enable interaction with at least a portion of the curated content at each of the one or more remote devices.

20 Claims, 32 Drawing Sheets

Related U.S. Application Data

26, 2013, provisional application No. 61/845,743, filed on Jul. 12, 2013.

(56) References Cited

U.S. PATENT DOCUMENTS

| | | |
|---|---|---|
| 8,745,657 B2 | 6/2014 | Chalozin et al. |
| 9,036,043 B2 | 5/2015 | Segal |
| 9,363,448 B2 | 6/2016 | Segal |
| 2001/0006382 A1 | 7/2001 | Sevat |
| 2002/0186233 A1 | 12/2002 | Holtz et al. |
| 2005/0137958 A1 | 6/2005 | Huber et al. |
| 2008/0096175 A1 | 4/2008 | Du Toit et al. |
| 2008/0120675 A1 | 5/2008 | Morad et al. |
| 2008/0150913 A1 | 6/2008 | Bell et al. |
| 2009/0153804 A1 | 6/2009 | Giraldo et al. |
| 2009/0237565 A1 | 9/2009 | Staker et al. |
| 2010/0174783 A1 | 7/2010 | Zarom |
| 2011/0202827 A1 | 8/2011 | Freishtat |
| 2011/0298935 A1 | 12/2011 | Segal |
| 2013/0073985 A1 | 3/2013 | Hamlin et al. |
| 2013/0173355 A1 | 7/2013 | Barcenas |
| 2013/0212615 A1 | 8/2013 | Schultz |
| 2014/0002581 A1 | 1/2014 | Bear et al. |
| 2014/0086557 A1 | 3/2014 | Yu et al. |
| 2014/0132702 A1 | 5/2014 | Leibovich et al. |
| 2014/0215542 A1 | 7/2014 | Terpe |
| 2016/0098941 A1 | 4/2016 | Kerluke |

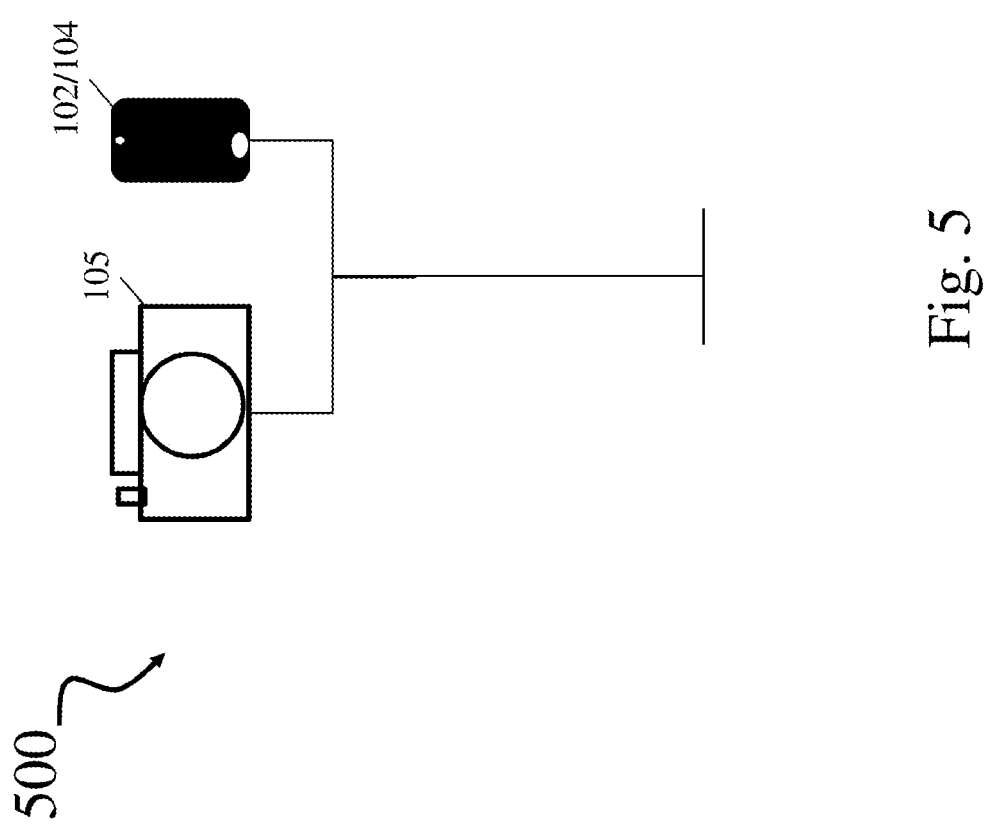

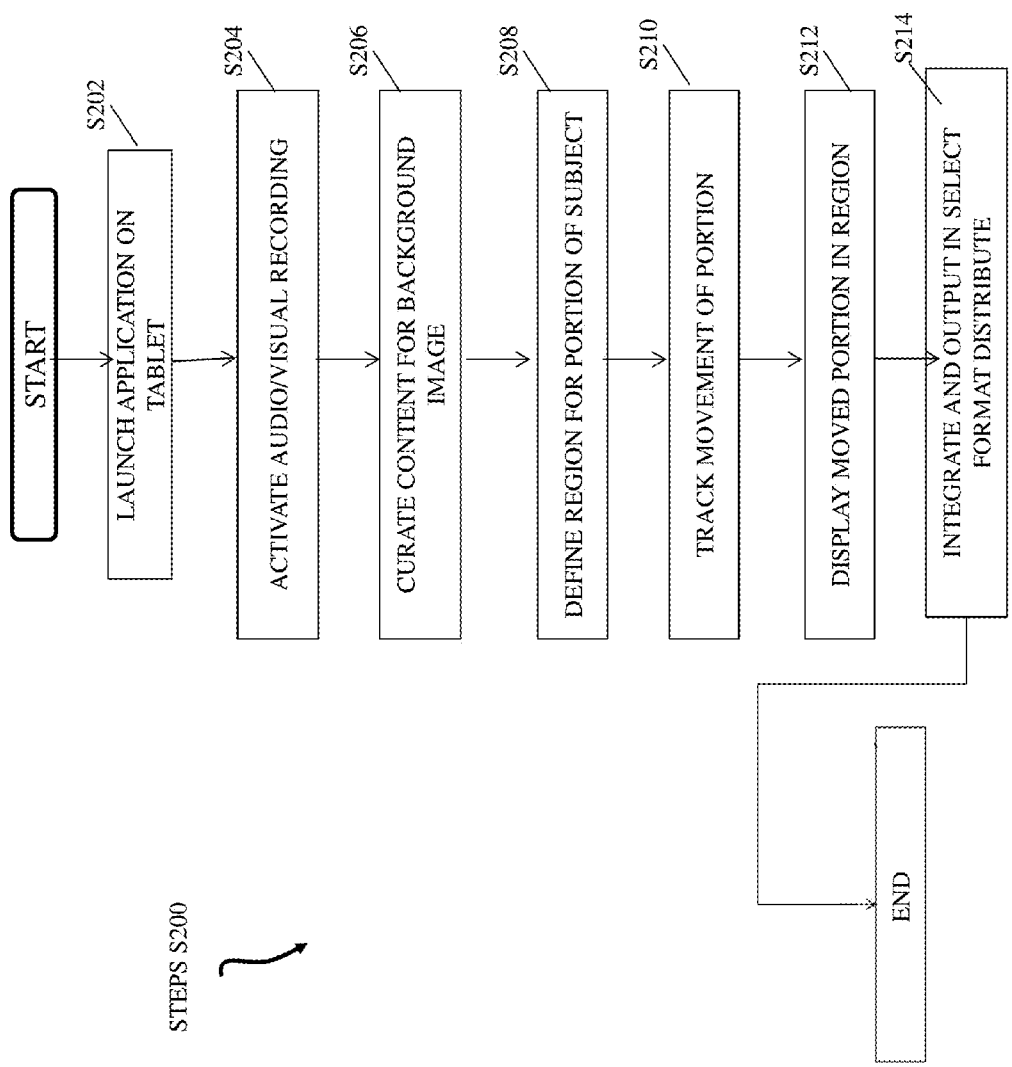

SYSTEM AND METHOD FOR PROVIDING AND INTERACTING WITH COORDINATED PRESENTATIONS

CROSS-REFERENCE TO RELATED APPLICATION

This patent application is a continuation-in-part of U.S. patent application Ser. No. 14/813,974, filed Jul. 30, 2015, now U.S. Pat. No. 9,666,231, issued May 30, 2017, which is based on and claims priority to U.S. Provisional Patent Application Ser. No. 62/031,114, filed on Jul. 30, 2014, and Ser. No. 14/813,974 is a continuation-in-part of U.S. patent application Ser. No. 14/316,536, filed Jun. 26, 2014; further this application is a continuation-in-part of U.S. patent application Ser. No. 15/247,534, filed Aug. 25, 2016, the entire contents of all of which are incorporated by reference as if expressly set forth in their respective entireties herein.

FIELD

The present application relates, generally, to content presentation and, more particularly, to a system and method for providing and interacting with coordinated presentations.

BACKGROUND

Interactive and supplemental content that has been made available to viewers has been done through a decoupled, separate communication channel. For instance, a producer can provide a separate communication channel with data, a video stream, or both over the Internet via a URL associated with the broadcast. For example, a television station can have on-air programming and also provide supplemental Internet-based content available through a website. Apart from sponsoring both sources of information, these communication channels are generally decoupled from one another. In other words, the broadcaster has only an indirect relationship to the viewer with regard to any supplemental content.

The present application addresses this in a system and method in which the broadcaster, who may be an individual using a portable computer device, provides viewers with the ability to launch supplemental content that has been curated by the broadcaster to the topics and information sources chosen by the broadcaster. As such, a more personal and deeper experience can be had by utilizing the present invention.

It is with respect to these and other considerations that the disclosure made herein is presented.

BRIEF SUMMARY OF THE INVENTION

In one or more implementations, herein is a system and method for generating a coordinated presentation. A computing device having a processor and a memory is configured by code stored in the memory and executed by the processor to curate content selected by a user for inclusion in the coordinated presentation. A plurality of images is captured, at least via an image capture device, for inclusion in the coordinated presentation. A first data stream associated with the curated content and a second data stream associated with the captured images are received, and a portion of a subject within each of the plurality of images in the second data stream is defined, wherein the portion comprises less than any one image. An appearance of movement of the portion of the subject is tracked within each of the plurality of images, and at least some of the plurality of images in the second data stream is modified, as a function of the tracked appearance of movement, by displaying the portion in a single position. The respective content associated with the two data streams is integrated, including the modified at least some of the plurality of images, to generate the coordinated presentation that is capable of transmission to and receipt by one or more remote devices, and wherein the coordinated presentation is configured to enable interaction with at least a portion of the curated content at each of the one or more remote devices.

These and other aspects, features, and advantages of the invention can be understood with reference to the following detailed description of certain embodiments of the invention taken together in conjunction with the accompanying drawing figures.

BRIEF DESCRIPTION OF THE DRAWINGS

Further aspects of the present disclosure will be more readily appreciated upon review of the detailed description of its various embodiments, described below, when taken in conjunction with the accompanying drawings, of which:

FIG. 5 is a simple block diagram that represents a rig that is configured with a camera and computing device;

FIG. 15 is a flow diagram showing a routine that illustrates a broad aspect of the present application.

DETAILED DESCRIPTION OF THE EMBODIMENTS

Figure 1:
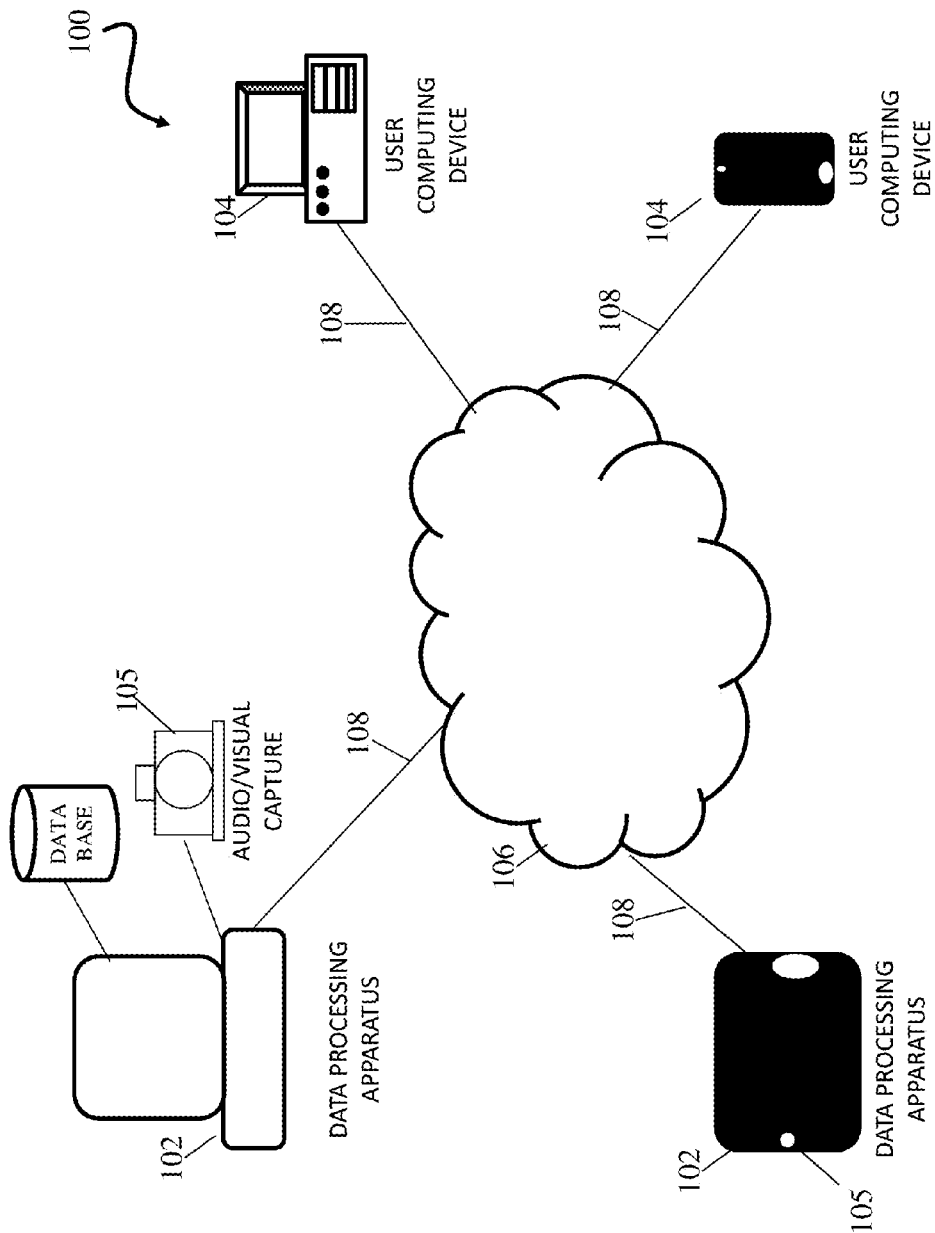
FIG. 1 is a diagram illustrating an example hardware arrangement that operates for providing the systems and methods disclosed herein.

By way of introduction and overview, in one or more implementations the present application provides systems and methods for authoring and playing video that can be layered with interactive content, including content that is available over one or more data communication networks, such as the Internet. Devices operating, for example, iOS, ANDROID, WINDOWS MOBILE, BLACKBERRY, MAC OS, WINDOWS or other operating systems are configured to provide functionality, such as an authoring tool and interface for developing distributable coordinated presentations including videos that include customizable and interactive features for use by one or more end-users that receive the presentations. Further, the software applications provide a viewing/interactive tool, referred to herein, generally, as a "consuming" interface, for end-users who receive videos that are authored in accordance with the present application. Using the client interface, users may interact with videos as a function of touch and gestures, as well as other suitable interfaces, such as a mouse, trackball, keyboard or other input. Some functionality available for end-users is defined by an author.

In one or more implementations, a video mixer module can be provided that comprises instructions executing so as to configure a processor to integrate a plurality of images captured by a camera together with a portion of the curated content via a user selection from a touch-screen interface, and thereby to generate a coordinated presentation that is capable of transmission to and receipt by one or more remote devices; and wherein the coordinated presentation is configured to enable interaction with the portion of the curated content at each of the remote devices such that results of a respective interaction at a particular remote device are viewable at the particular remote device but are not viewable at (a) other of the remote devices and (b) the display.

In one or more implementations, coordinated presentations may be configured with interactive options, which may include images, video content, website content, or computer programs (collectively referred to herein, generally, as "vApps"). An authoring tool can be integrated with a player tool, and the tools enable one or more vApps to be embedded in video or, in one or more implementations, a code is embedded in the video for enhanced functionality. For example, a play/pause button can be provided that enables a user to play or pause playback of a coordinated presentation. A timeline function can be provided that identifies a current time location within a coordinated presentation as well as to navigate therein. VApp icons can be provided that represent vApps that are included with the current coordinated presentation at respective time locations therein. In accordance with one or more implementations, as a respective icon is selected by the user, the coordinated presentation jumps to the corresponding time location, and the user can interact with the respective vApp. Information can be time coded in video, and selectable user interactive elements for navigation/time can be provided.

In one or more implementations, the present application includes and improves functionality for chroma key compositing, often referred to as use of a "green screen" and/or "blue screen." In one or more implementations, a computing device configured with an authoring tool and interface for developing distributable coordinated presentations manipulates background content provided in a coordinated presentation as a function of the movement and angle the camera(s) used during recording of the coordinated presentation. In addition or in the alternative to basing the manipulation of background content on movement and/or the angle of a camera used during recording, one or more foreground elements can be the basis of such background manipulation. Thus, a module executing on a device configured with an authoring tool detects an angle of view, such as a function of camera position and/or angle of view of one or more foreground elements, and manipulates the appearance of the composited background content to eliminate an otherwise static appearance of the background content. The background content can be, for example, a composited in place of background provided in a respective color range (e.g., green). By manipulating the background content in a dynamic way, the background content eliminates a static appearance that otherwise decreases the realism of the imagery, and requires more from the viewer to suspend disbelief. By adjusting and/or manipulating the virtual background in association with movement or visual appearance of foreground elements, the coordinated presentation appears significantly more real to the viewer.

Various embodiments and aspects of the invention(s) will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present application.

Referring to FIG. 1 a diagram is provided of an example hardware arrangement that operates for providing the systems and methods disclosed herein, and designated generally as system 100. System 100 can include one or more data processing apparatuses 102 that are at least communicatively coupled to one or more user computing devices 104 across communication network 106. Data processing apparatuses 102 and user computing devices 104 can include, for example, mobile computing devices such as tablet computing devices, smartphones, personal digital assistants or the like, as well as laptop computers and/or desktop computers. Further, one computing device may be configured as a data processing apparatus 102 and a user computing device 104, depending upon operations be executed at a particular time. In addition, an audio/visual capture device 105 is depicted in FIG. 1, which can be configured with one or more cameras (e.g., front-facing and rear-facing cameras), a microphone, a microprocessor, and a communications module(s) and that is coupled to data processing apparatus 102. The audio/visual capture device 105 can be configured to interface with one or more data processing apparatuses 102 for producing high-quality audio/video content.

With continued reference to FIG. 1, data processing apparatus 102 can be configured to access one or more databases for the present application, including image files, video content, documents, audio/video recordings, metadata and other information. In addition, data processing apparatus 102 can be configured to access Internet websites and other online content. It is contemplated that data processing apparatus 102 can access any required databases via communication network 106 or any other communication network to which data processing apparatus 102 has access. Data processing apparatus 102 can communicate with devices including those that comprise databases, using any known communication method, including Ethernet, direct serial, parallel, universal serial bus ("USB") interface, and/or via a local or wide area network.

User computing devices 104 communicate with data processing apparatuses 102 using data connections 108, which are respectively coupled to communication network 106. Communication network 106 can be any communication network, but is typically the Internet or some other global computer network. Data connections 108 can be any known arrangement for accessing communication network 106, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, software applications, or other software and/or hardware tools, to provide received data on audio/visual devices incorporated therewith. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and data processing apparatuses 102. In one or more implementations, the present application provides improved processing techniques to prevent packet loss, to improve handling interruptions in communications, and other issues associated with wireless technology.

According to an embodiment of the present application, user computing device 104 provides user access to data processing apparatus 102 for the purpose of receiving and providing information. Examples and description of specific functionality provided by system 100, and in particular data processing apparatuses 102, is described in detail below.

System 100 preferably includes software that provides functionality described in greater detail herein, and preferably resides on one or more data processing apparatuses 102 and/or user computing devices 104. One of the functions performed by data processing apparatus 102 is that of operating as a web server and/or a web site host. Data processing apparatuses 102 typically communicate with communication network 106 across a permanent i.e., unswitched data connection 108. Permanent connectivity ensures that access to data processing apparatuses 102 is always available.

Figure 2A:
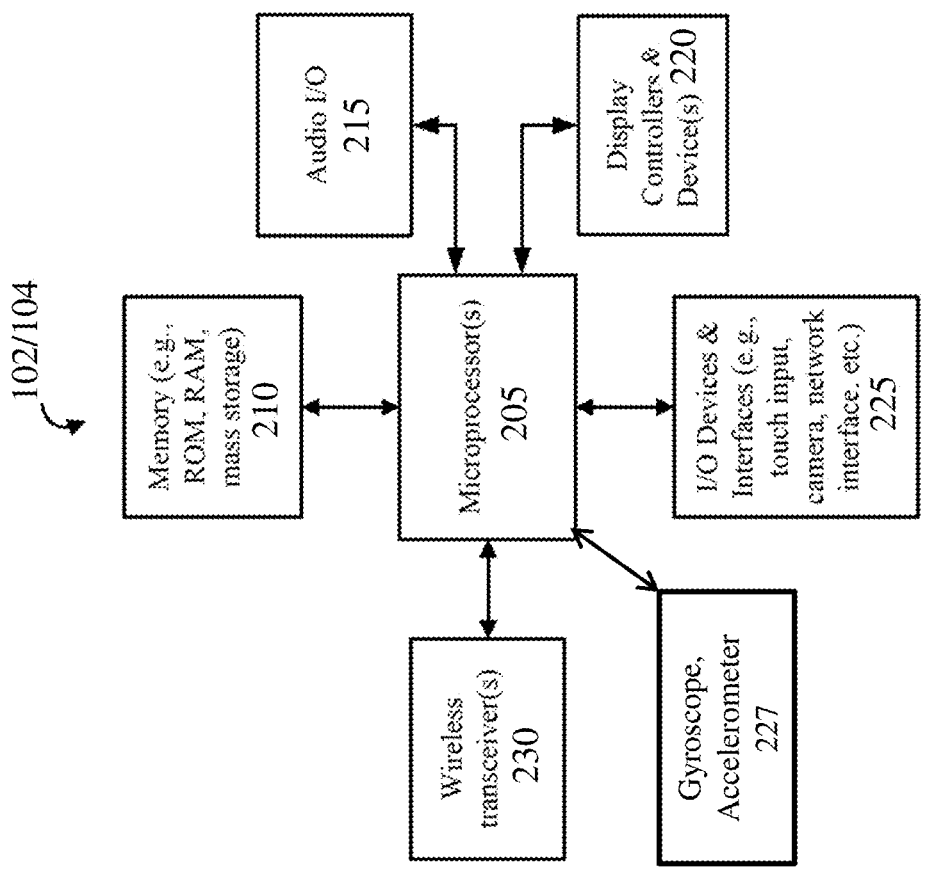
FIG. 2A is a block diagram that illustrates functional elements of a computing device in accordance with an embodiment.

FIG. 2A illustrates, in block diagram form, an exemplary data processing apparatus 102 and/or user computing device 104 that can provide functionality in accordance with interactive conferencing, as described herein. Although not expressly indicated, one or more features shown and described with reference with FIG. 2A can be included with or in the audio/visual capture device 105, as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type of memory.

The data processing apparatus 102 and/or user computing device 104 also includes an audio input/output subsystem 215 which may include a microphone and/or a speaker for, for example, playing back music, providing telephone or voice/video chat functionality through the speaker and microphone, etc.

A display controller and display device 220 provides a visual user interface for the user; this user interface may include a graphical user interface which, for example, is similar to that shown on a Macintosh computer when running Mac OS operating system software or an iPad, iPhone, or similar device when running mobile computing device operating system software.

The data processing apparatus 102 and/or user computing device 104 also includes one or more wireless transceivers 230, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network. In addition, Gyroscope/Accelerometer 235 can be provided.

It will be appreciated that one or more buses, may be used to interconnect the various modules in the block diagram shown in FIG. 2A.

The data processing apparatus 102 and/or user computing device 104 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing apparatus 102 and/or user computing device 104 may be a network computer or an embedded processing apparatus within another device or consumer electronic product.

The data processing apparatus 102 and/or user computing device 104 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 102 and/or user computing device 104. The I/O devices and interfaces 225 may include a connector for a dock or a connector for a USB interface, FireWire, etc. to connect the system 100 with another device, external component, or a network.

Moreover, the I/O devices and interfaces can include gyroscope and/or accelerometer 227, which can be configured to detect 3-axis angular acceleration around the X, Y and Z axes, enabling precise calculation, for example, of yaw, pitch, and roll. The gyroscope and/or accelerometer 227 can be configured as a sensor that detects acceleration, shake, vibration shock, or fall of a device 102/104, for example, by detecting linear acceleration along one of three axes (X, Y and Z). The gyroscope can work in conjunction with the accelerometer, to provide detailed and precise information about the device's axial movement in space. More particularly, the 3 axes of the gyroscope combined with the 3 axes of the accelerometer enable the device to recognize approximately how far, fast, and in which direction it has moved to generate telemetry information associated therewith, and that is processed to generate coordinated presentations, such as shown and described herein.

It will be appreciated that additional components, not shown, may also be part of the data processing apparatus 102 and/or user computing device 104, and, in certain embodiments, fewer components than that shown in FIG. 2A may also be used in data processing apparatus 102 and/or user computing device 104. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 210 or other machine-readable storage medium. The software may further be transmitted or received over a network (not shown) via a network interface device 225. In various embodiments, hardwired circuitry may be used in combination with the software instructions to implement the present embodiments. Thus, the techniques are not limited to any specific combination of hardware circuitry and software, or to any particular source for the instructions executed by the data processing apparatus 102 and/or user computing device 104.

Figure 2B:
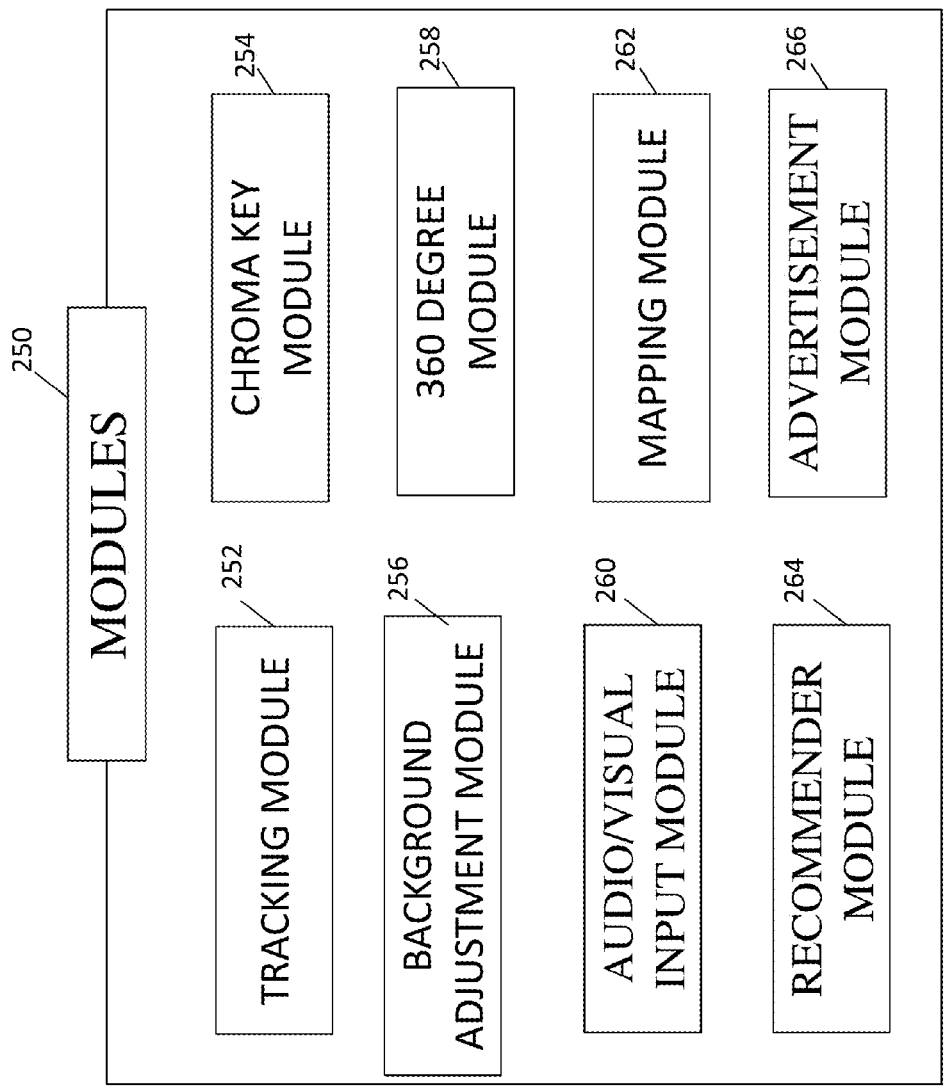
FIG. 2B is a block diagram representing a plurality of modules that provide functionality shown and described herein.

FIG. 2B is a block diagram representing a plurality of modules 250 that provide functionality shown and described herein. It is to be appreciated that several of the logical operations described herein can be implemented (1) as a sequence of computer implemented acts or program modules running on the various devices of the system 100 and/or (2) as interconnected machine logic circuits or circuit modules within the system (100). One or more particular implementations can be configured as a function of specifications of a particular device (e.g., size, energy, consumption, performance, etc.). Accordingly, the logical operations described herein are referred to variously as operations, steps, structural devices, acts, or modules. As referenced above, the various operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein. Depending upon a respective implementation, the modules 250 can be provided via a single computing device, such as data processing apparatus 102, or can be distributed via a plurality of computing devices, such as computing devices 102 and/or 104. Moreover, one module can be provided via a single computing device (102 or 104), or can be distributed across a plurality of computing devices.

Included in the arrangement shown in FIG. 2B, various modules are programmatically tied by data processing apparatus 102 and/or user computing device 104. In the example shown in FIG. 2B is tracking module 252 that includes functionality for detecting acceleration and movement in space, and/or for providing and/or processing in association with such movement. The tracking module 152 can transform data collected as a resulting movement of the computing device 104, as well as other "passive" information, such as timestamp information, into new information. The time stamp can function as a key for coordinating telemetry information and image/sound content. Information, such as the timestamp or information transformed by tracking module 152 can be embedded into the stream for use in generating and/or viewing coordinated presentations. Chroma key module 254 includes functionality for users to select one or more pixels and define one or more colors, degrees or a range of color or other input that is used as a basis for defining portions of a frame to be removed or replaced by background content (e.g., green screen functionality). Also illustrated in FIG. 2B is background adjustment module 256 that is configured to modify the appearance of background content, such as to move the background content or change the angle of view in accordance with telemetry information received and processed as a function of tracking module 252. These modules can include tools (e.g., class files, packages or other program resources) that enable software developers to interface with one or more hardware and software systems and to develop and/or access custom video software applications, such as shown and described herein. Further, 360 degree module 258 is configured to display up to a 360° view of content displayed on computing device 102/104, including in response to information received and processed as a function of tracking module 252. For example, the content includes a "stitched" image file having a 360 degree field of view horizontally, and further includes a 180 degree field of view degree. The present application can include interactive capability for providing the content in a 360-degree view.

Continuing with reference to FIG. 2B, Audio/Visual input module 260 includes functionality to interface with audio/visual devices, such as configured to interface with data processing apparatus 102 and/or user computing device 104. For example, Audio/Visual input module 260 interfaces with a camera and microphone communicatively coupled to data processing apparatus 102 for use in authoring videos that can be layered with interactive content, such as shown and described herein. Such hardware can be used to capture images and sound for use in generating content that is composited with other graphic and/or sonic data.

In one or more implementations, the present application can include an effects module 262 that enables one or more processing effects on audio and/or video. Among other effects, including those shown and described herein, green screen and white screen functionality can be provided to enable virtual placement of a presenter of video content in respective environments. Other example effects processing associated with effects module 262 is shown and described below.

Continuing with reference to FIG. 2B, Recommender Module 264 can be included that is configured to provide tools that interface with one or more hardware and software systems and to support content sharing and a new form of social networking as a function of accessible video files that can be layered with various interactive content, and that can be authored, distributed and played in accordance with the teachings herein. Further, Advertisement Module 266 can be included that is usable to interface with one or more hardware and software systems to provide advertisements in particular context and times.

Figure 3:
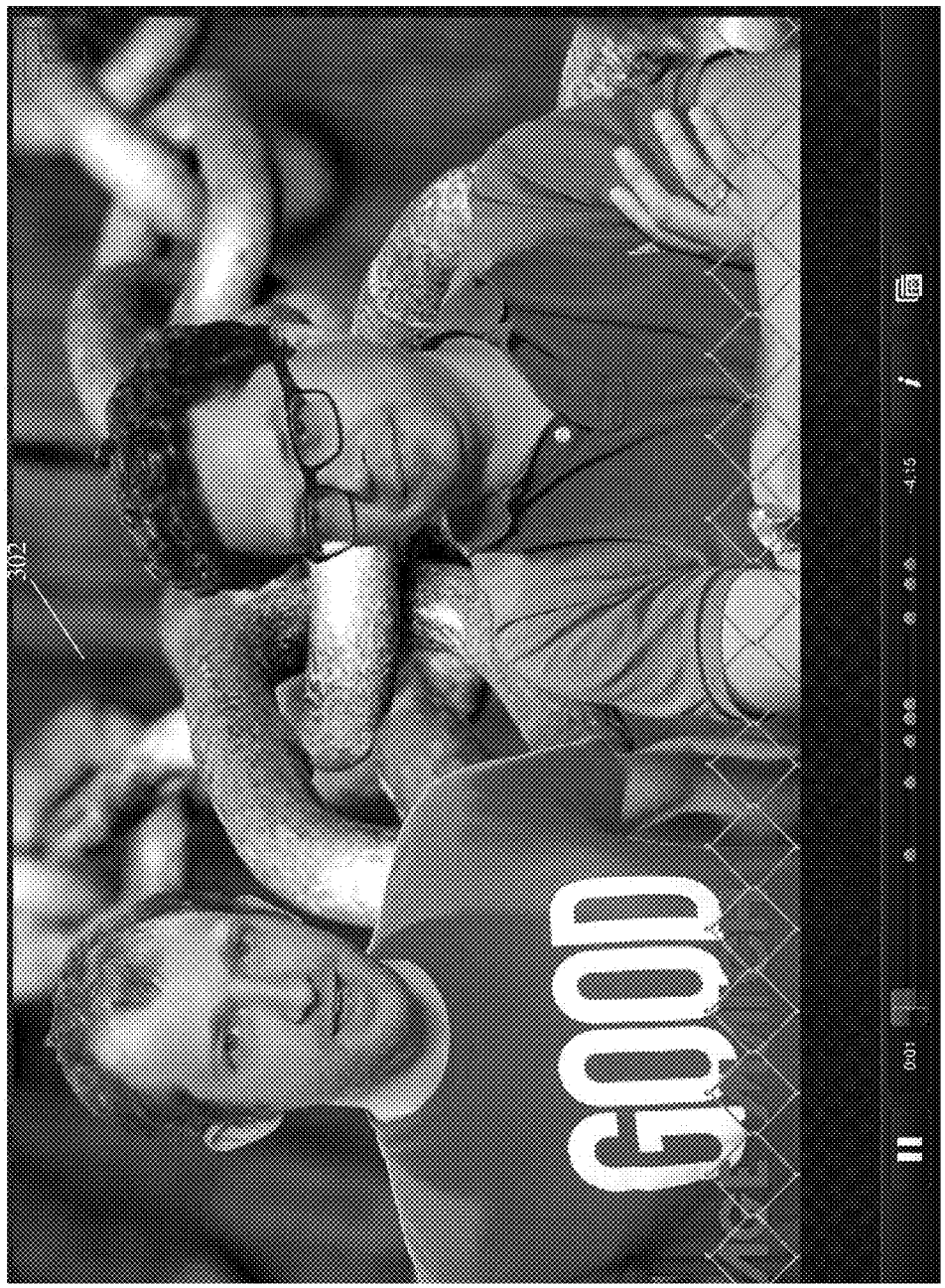
FIG. 3 illustrates an example coordinated presentation that illustrates the effect of green screen functionality provided in accordance with one or more implementations of the present application.

FIG. 3 illustrates an example interface for authoring a coordinated presentation and that shows the effect of green screen functionality provided in accordance with one or more implementations of the present application. As shown in FIG. 3, green screen portion 302 is shown in connection with an image file of a chain linked fence behind a foreground element, e.g., the people who are being photographed, and thereafter combined in the coordinated presentation.

As used herein a "presenter" refers, generally, to a person, organization and/or computing device associated therewith that makes and/or distributes coordinated presentations for others to consume. The present application can operate to provide functionality for substantially real-time compositing, which can include capturing of whatever is being displayed in the video frame, including from the camera or other content source, as well as capturing meta-data that is around or otherwise associated with one or more elements of the content, which is usable to report to a player device at a later point in time. Meta-data can include, for example, XML data. In this way, when a user interacts with a coordinated presentation, hypertext markup language ("HTML") (or other suitable content) may be served from the host server and used as a function in the coordinated presentation. This enables implementation of a fully (or at least partially) interactive platform.

During development of a new coordinated presentation, the present application provides a plurality of templates (also referred to generally as "Themes") for quickly authoring a coordinated presentation (e.g., a "TouchCast") that is configured with one or more features associated with a particular style or subject matter. For example, options are available for authoring a new coordinated presentation, which may be in a default configuration and absent of any particular theme, as well as for authoring a new coordinated presentation using or based on a particular theme (e.g., a newscast). Moreover, data processing apparatus 102 and/or user computing device 104 can provide one or more options for "Green Screen" functionality in the authoring tool for authoring a coordinated presentation. As noted herein, options are provided for a user to substitute a virtual background in a coordinated presentation in one or more locations that are defined as a function of color (e.g., a "chroma key"). In one or more implementations, a graphical user interface associated with the authoring tool is configured with a color dropper control that, when selected by the user, enables the user to define a chroma key value, such as from one or more pixels, which represents one or more suitable portions of the background of the coordinated presentation to be replaced by other content, such as an image, video, as well as HTML-based or other content. Using the controls provided, for example, in a display screen enables an extremely flexible way to define custom green screen functionality for coordinated presentations. Other controls can be included, such as sensitivity and smoothing slider controls, which operate to impact the relative smoothness and impacts of green-screen content. Such controls can reduce the impact of light reflecting from a chroma (e.g., green) screen onto a subject, which can impact realism and better integrate the subject into the background content. Further, a sound effects control can be included that enables soundboard functionality which can be selected during recording of a coordinated presentation. For example, a car horn, cymbal crash or virtually any other sound effect can be added to a coordinated presentation.

Figure 4A:
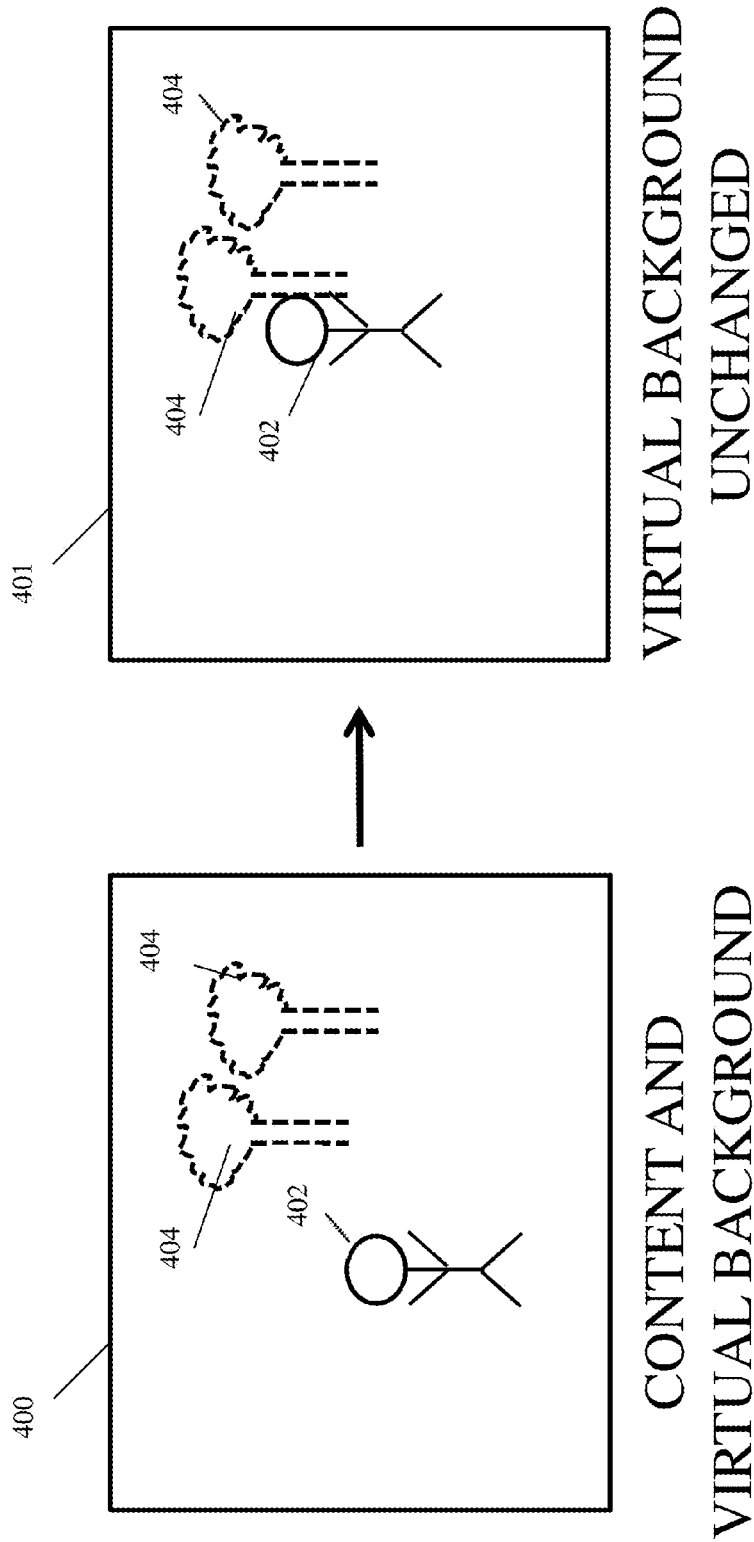
FIGS. 4A and 4B illustrate two video frames of an example coordinated presentation.
Figure 4B:
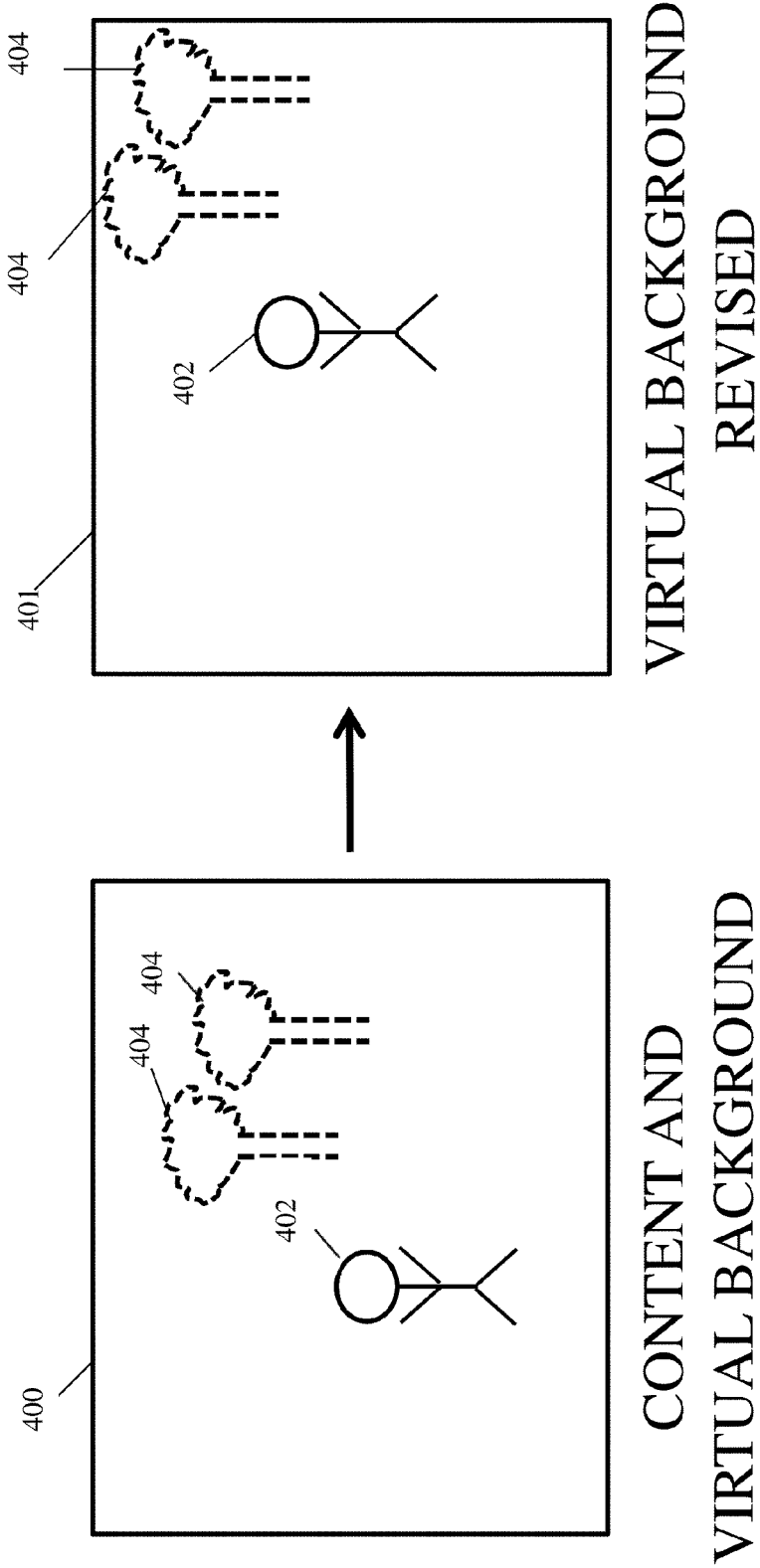

FIGS. 4A and 4B illustrate two video frames 400 and 401 of an example coordinated presentation and that represent changes in the foreground (photographed) element 402 which, in FIGS. 4A and 4B, is represented as a human stick figure and in solid lines. The example shown in FIGS. 4A and 4B, the foreground element 402 appears to have moved from one portion of the frame to another portion. The change could have occurred for various reasons, such as a result of camera and/or computing device movement, which can be tracked as a function of tracking module 252, and which generates new information as a result of such tracking. In FIGS. 4A and 4B, the virtual background elements 404 are represented as trees and in broken lines. In the example shown in FIG. 4A, the background areas 404 are static (e.g., not moving) and, accordingly, the frame 401 does not appear realistic because the movement of the foreground area 402 (or the movement of the angle of view of foreground area 402), such as due to camera panning, is not represented in the background areas 404. On the other hand, the frame 401 shown in FIG. 4B appears more realistic due to appropriate repositioning of the background elements 404 in view of the movement of the foreground area 402 through use of the new information from the tracking module. This eliminates a need for a viewer of the coordinated presentation to suspend disbelief, as the background elements are modified substantially in real-time in response to movements associated with the foreground element 402, the camera 105, computing device 102/104 and/or other virtual or physical element.

In one or more implementations, information is processed by tracking module 252, including telemetry information associated with an accelerometer and/or gyroscope and associated with image frames in video. This can be processed to affect a selection of a respective chroma key, to select content associated with a chroma key, and/or as well as for the relative placement of a subject in the frame, such as a person being photographed during production of a coordinated presentation. The placement of the subject in the frame, as well as the appearance of background content that is superimposed (e.g., as a function of the chroma key) can be modified and adjusted in response to output from the tracking module 252, as well as in response to internal and/or external parameters, such as GPS-based information, gesture-based user input, timestamp information, and image visual effects.

Information associated with the telemetry of the camera and/or computing device 104 (including gyroscope and accelerometer 227), including as a function of tracking module 252, is processed to determine the position and/or location of a subject in the foreground, and used to control the orientation and angle of view of the background content substantially in real-time as the coordinated presentation is being viewed. Accordingly, the positioning of the elements being displayed in the coordinated composite image is optimized. In one or more implementations, the processed information is used as input to one or more algorithms that configure a processor to alter the appearance of the background content, such as by providing movement of the background content relative to movement of one or more subjects in the foreground and/or movement of an angle of view of one or more subjects in the foreground.

In one or more implementations of the present application, information associated with one or more active user events and/or inactive effects, such as zoom, virtual/optical effects (e.g., fisheye), GPS tracking information or the like can be processed to provide input, as well, and that contributes to a determination of suitable movement and/or adjustment of the background content. For example, gyroscope and/or accelerometer information captured in accordance with tracking module 252 is stored in one or more databases, such as in a data log file. The gyroscope and/or accelerometer information can be captured frame by frame, and can represent the position, orientation and/or heading associated with content in each frame. The background adjustment module processes information representing, for example, that pivoting occurs (e.g., by the camera 105) and results in corresponding pivot and/or other adjustment of the appearance of the virtual background.

Furthermore, a single computing device 102/104, such as a mobile computing device configured as a tablet computer or smart phone, can be configured to provide the features shown and described herein. In an alternative implementation represented in a simple block diagram shown in FIG. 5, a rig 500 is provided that is configured with a camera 105 and computing device 102/104. Camera 105 may be a digital single lens reflex camera or other camera that is configured with an image sensor of higher quality or capacity than included with computing device 102/104, and usable to provide high-quality image content. Using rig 500, the standalone camera 105 and camera 105 and the camera that is configured and/or integrated with computing device 102/104 can both be used to photograph simultaneously from a common reference frame and/or vantage point. Telemetry information from computing device 102/104, such as provided by tracking module 252, is processed to control the appearance of background content that has been added to the coordinated presentation, such as to affect the appearance of the angle, distance, viewpoint, or the like of the background content. Alternatively, the computing device 102/104 can begin recording at a time earlier than the camera 105 which can result in more telemetry information than photographic content being captured from the standalone camera 105. Using postproduction methods, such as provided in video editing software, the photographic content captured by camera 105 can be synchronized with the telemetry information captured and processed in connection with computing device 102/104, to adjust virtual background content in the coordinated presentation, accordingly.

Figure 6:
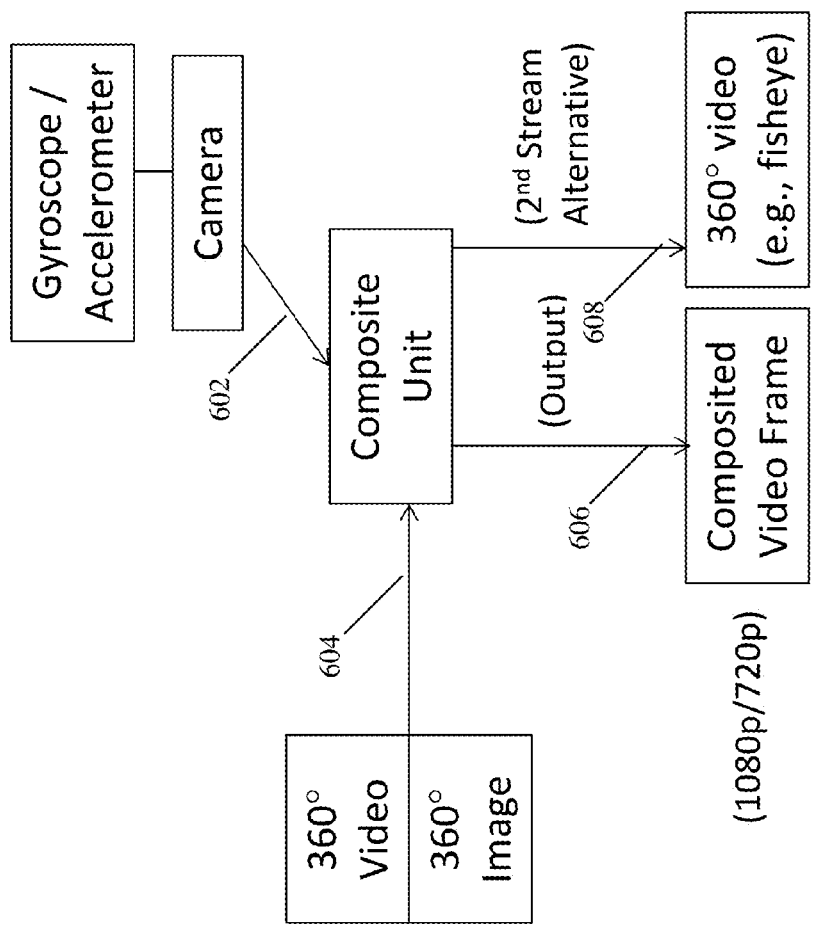
FIG. 6 is a block diagram illustrating features of the present application and configured to process two data streams into one single stream.

In one or more implementations, a computing device configured in accordance with the present application processes two data streams into one single stream, substantially as illustrated in the block diagrams shown in FIG. 6. One of the two streams can be captured by a camera, such as configured or integrated with a computing device (e.g., a smart phone camera), and the other of the two streams can be generated by a computing device or originate from a data file, such as an image file (e.g., TIFF, JPG, PNG, or BMP format). As one or more elements represented in the first data stream change, such as by a movement of five pixels up and three pixels to the right, a corresponding and opposite adjustment is made to one or more background elements 404 represented in the second stream, such as to move a background element 404 five pixels down and three pixels to the left. This can generate a smooth and realistic appearance of the coordinated presentation, as a function of the background adjustment module 256. In one or more implementations, a mapping module 262 is provided that identifies a set of objects (e.g., foreground elements 402 and background elements 404), and manipulates the appearance of objects and/or set of objects. In addition to movement and relocation of one or more background elements 404, the present application supports complex manipulations, such as via background adjustment module 256, including to account for pitch, yaw, and roll, and to modify the appearance of one or more background elements 404, such as to change the perspective, the skew, lighting and shadows or the like, such as in the context of one or more respective foreground elements. For example, adjustments can be made in connection with brightness, contrast and/or saturation.

Figure 7:
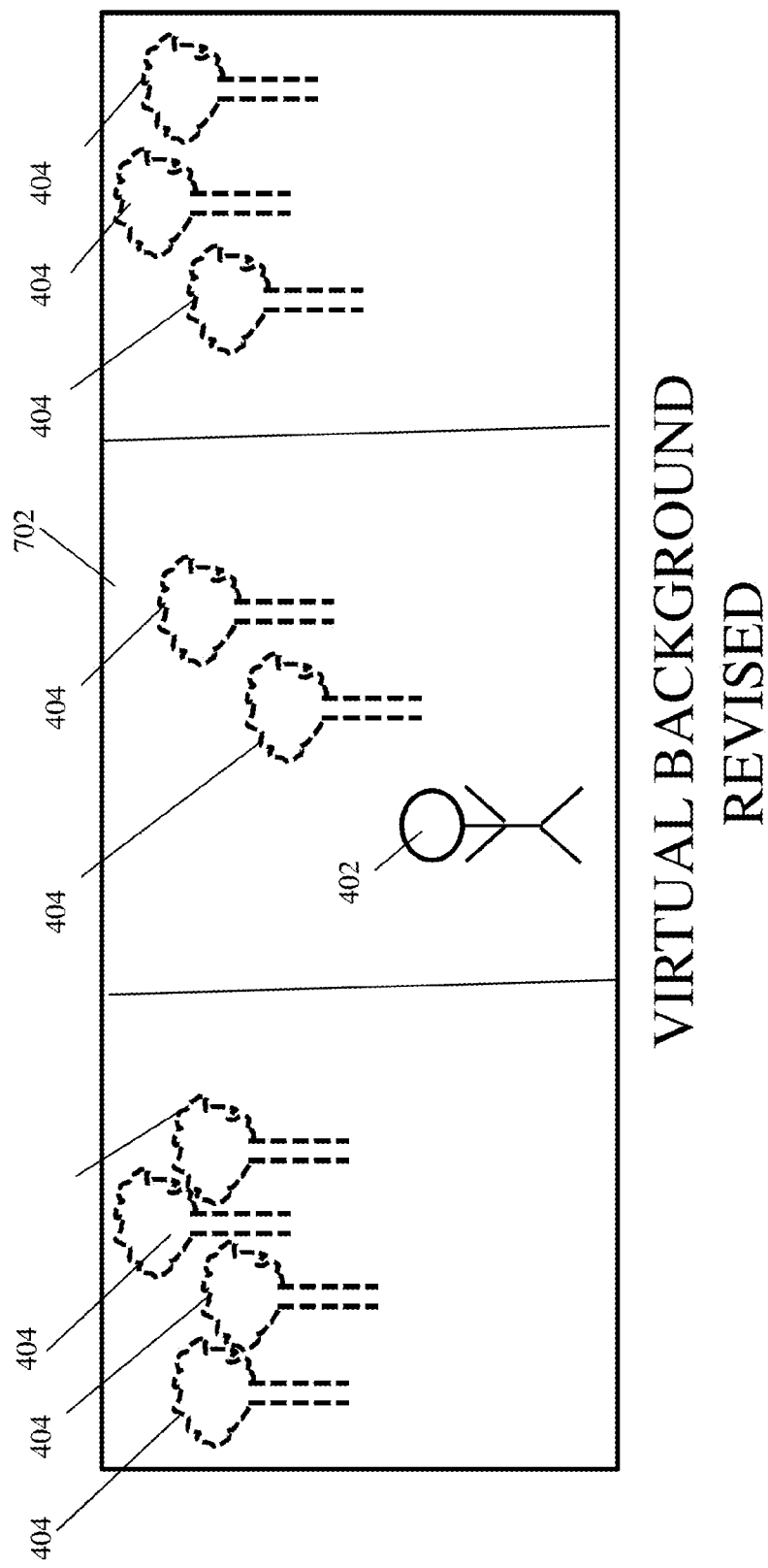
FIG. 7 illustrates an example representation, which includes a viewing area that includes a foreground element and two background elements, and a virtual background that extends past the viewing area.

Continuing with reference to the block diagrams shown in FIG. 6, in an alternative implementation, an alternative output stream 608 can be generated, which corresponds to the alternative implementation described below with reference to FIG. 7 and in connection with a 360° file, such as an image file, a 3-D file or some other content capable of supporting a 360° display and that is configurable as a virtual background. In yet another alternative, video can be provided that supports an effect of a 360° environment, including a 3-D environment, that the author of a coordinated presentation can explore (e.g., walk through, display to a viewer, or the like). Thus, in addition to 360° image files, video and 3-D files as possible background environments. The second alternative data stream 608 can be manipulable by the viewer during playback of the coordinated presentation. For example, as the viewer of the coordinated presentation moves his or her computing device 104, telemetry information is accessed by computing device 104 and the 360° virtual background image can pan accordingly.

The present application supports a virtual background provided in a coordinated presentation that can include content that extends beyond the viewing area of computing device 102/104. An example representation is shown in FIG. 7, which includes viewing area 702 that includes a foreground element 402 and two background elements 404. In the example shown in FIG. 7, the background comprises a 360° panoramic image and the presenter may wish to enable the viewer to see all 360° of the image within the context of one or more foreground elements 402. For example, a presenter may provide a coordinated presentation associated with an outdoor landscape and holds the computing device 104 that is integrated with camera 105 in front of her face and turns 360°. The virtual background elements 404 in the coordinated presentation appear to display the 360° view of the outdoor landscape behind the presenter, as telemetry information from the computing device 104 and camera 105 is processed by computing device 102 and/or 104.

Thus, in one or more implementations, such virtual 360° panning can be provided in the coordinated presentation and can respond to movement associated with the presenter. In one or more alternative implementations, such virtual 360° panning can be provided in the coordinated presentation in response to movement by the viewer of the coordinated presentation, for example on a tablet computing device 104. In the former case, the 360° virtual background may comprise a series of individual image frames that are "stitched" in context as information associated with the presenter's device telemetry is referenced, such as by adjustment module 256 and during generation of the coordinated presentation. In such implementations, the information associated with the presenter's computing device telemetry is usable to adjust virtual background elements 404, substantially as described herein, and that maintains a high degree of realism due to the relative adjustments of the background elements 404 to the foreground elements 402. Alternatively in the latter case, as panning occurs of the virtual background 360° image as the viewer of the coordinated presentation moves his or her computing device 104, although such background elements 404 adjustment relative to the foreground element(s) 402 may not occur due to a lack of telemetry information being available to mapping module 262 and/or background adjustment module 256.

In yet another alternative implementation, the viewer's computing device 104 can be configured to adjust the virtual background 360° image, such as shown and described herein, as a function of substantially real-time compiling of a coordinated presentation and elements 402, 404 thereof. As a viewer of a coordinated presentation can manipulate his or her computing device 104, telemetry information associated with a gyroscope and/or accelerometer configured with the device 104, for example, can be processed to modify the appearance of one or more virtual background elements 404, and/or the entire virtual background itself.

Figure 8:
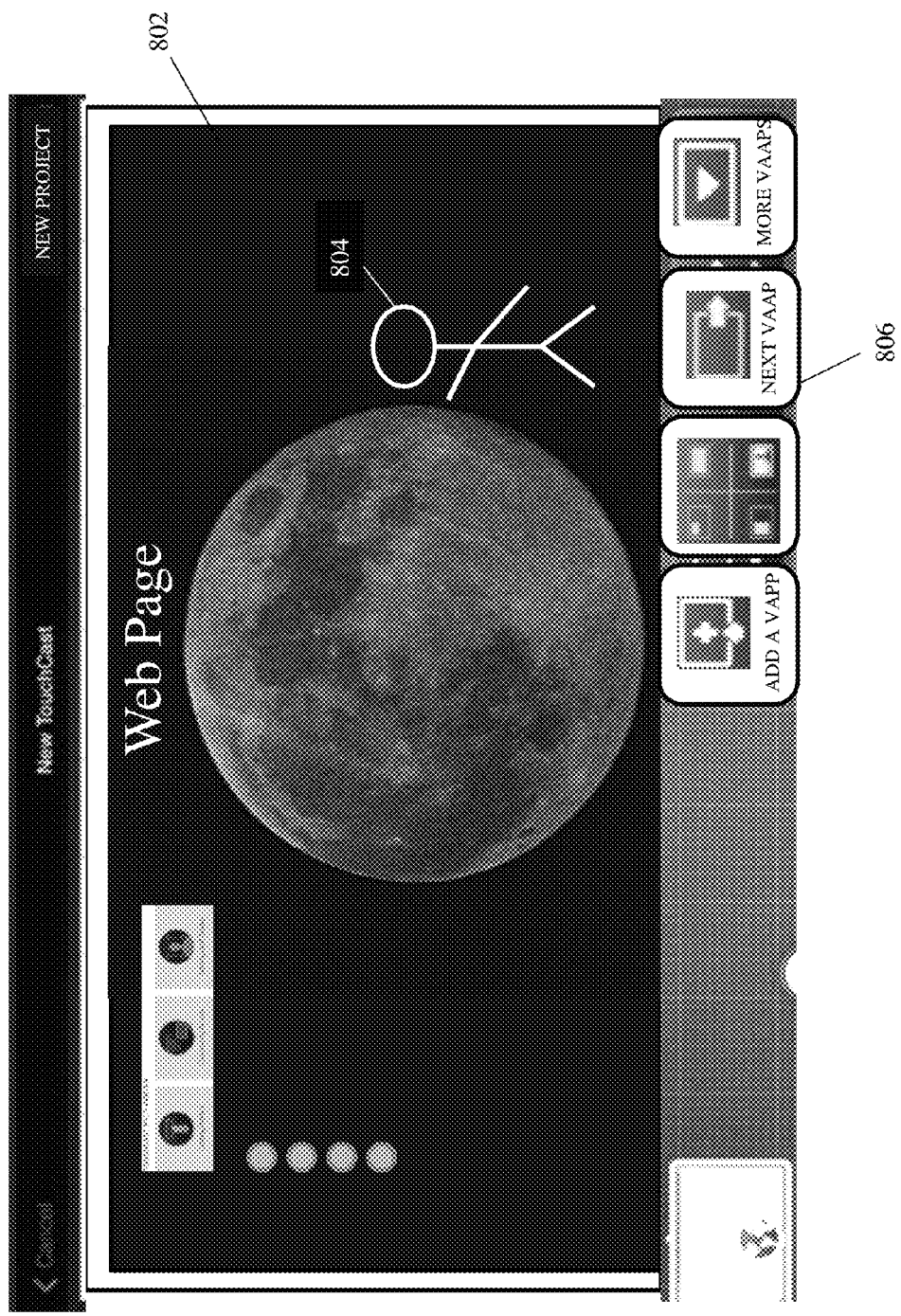
FIG. 8 illustrates an example representation of authoring a coordinated presentation in accordance with the present application.

In one or more implementations, the present application supports integrating content comprising HTML, such as a body of an Internet web page, as background in connection with green screen functionality. For example, during the authoring process and after selecting a control selecting for selecting green screen functionality, e.g., via chroma key module 254, an author can select a respective Internet web page to replace content. FIG. 8 illustrates an example implementation in which an interactive web page 802 is provided as a background content during authoring of a coordinated presentation. In addition to the web page 802 being chosen for the background content to replace any green-colored content, a user overlay option, referred generally herein as "silhouette," background author 804 can be virtually placed within the background content (e.g., web page 802), itself. Positioning of the author 804 within the background content can be affected using standard selection and movement gestures, such as swiping, pinching or the like. In addition to author 804 being provided as the foreground element, the author 804 can be switched as the background element. Accordingly, a vApp (e.g., web page 802) effectively becomes the background content, while maintain its interactivity, for example, for author and viewer.

Figure 9:
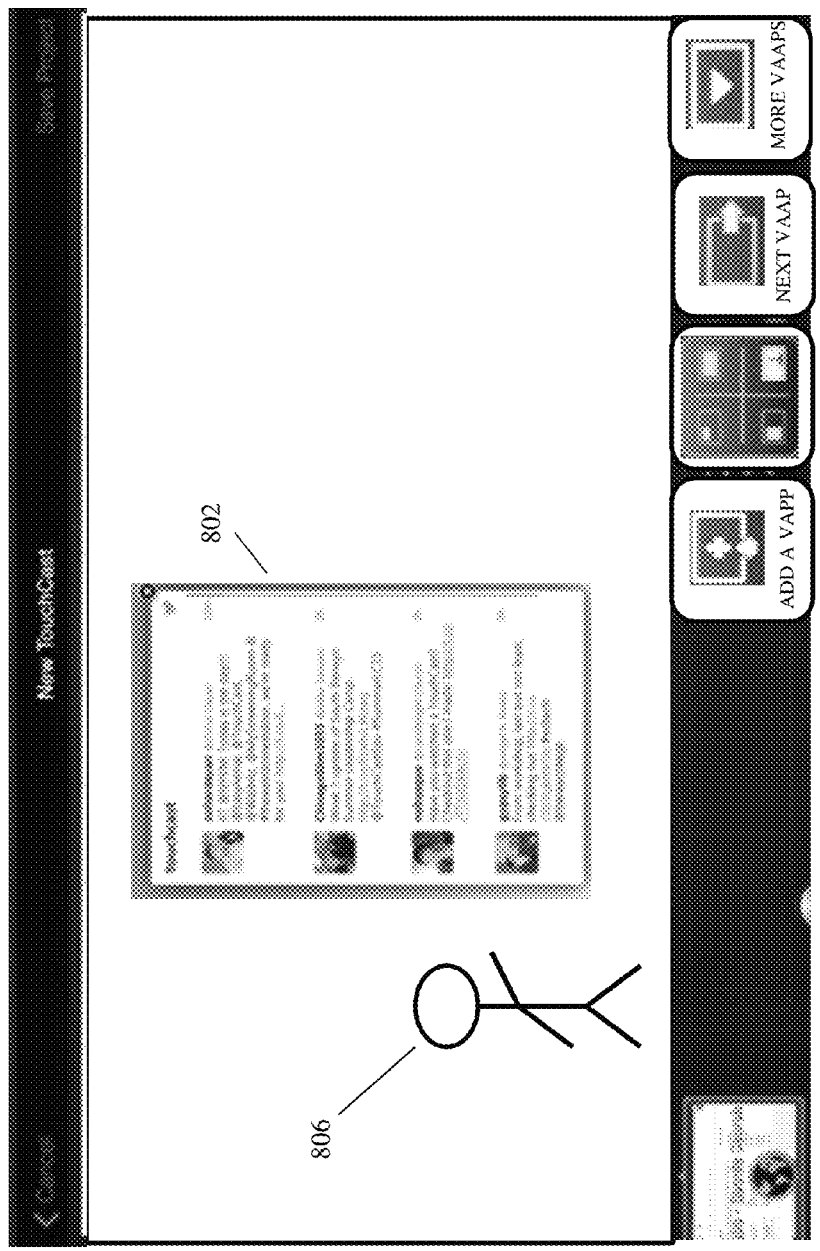
FIG. 9 illustrates another example representation of authoring a coordinated presentation in accordance with the present application.

FIG. 9 illustrates another example implementation of an authoring process in accordance with the present application, in which an interactive webpage 802 is provided as background content with the author 804 integrated therewith. In the example shown in FIG. 9, a social network content feed from a website 802, and is displayed as background content and integrated with author 804.

Figure 10:
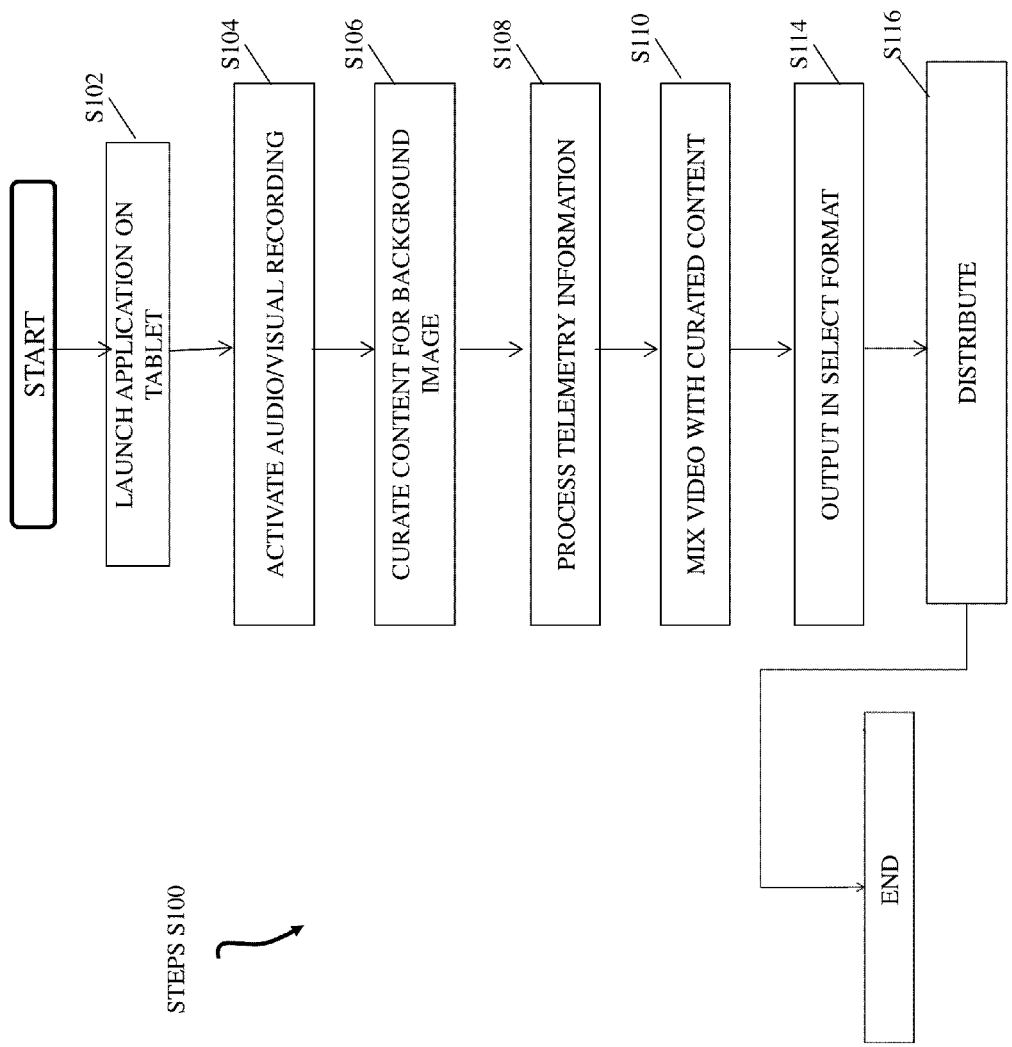
FIG. 10 is a flow diagram showing a routine that illustrates a broad aspect of a method for authoring a coordinated presentation.

Turning now to FIG. 10, a flow diagram is described showing a routine S100 that illustrates a broad aspect of a method for authoring a coordinated presentation 304 in accordance with at least one implementation disclosed herein. It should be appreciated that several of the logical operations described herein are implemented (1) as a sequence of computer implemented acts or program modules running on computing device 102/104 and/or (2) as interconnected machine logic circuits or circuit modules within computing device 102/104. The implementation is a matter of choice, dependent for example on the requirements of the device (e.g., size, mobility, energy, consumption, performance, etc.). Accordingly, the logical operations described herein are referred to variously as operations, steps, structural devices, acts, or modules. As referenced above, various ones of these operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

At step S102, the process starts, for the example, as an app launching on a tablet computing device. At step S104, options in the form of graphical screen controls are provided to a user for authoring a coordinated presentation 304, for example, in the form of camera controls, which are selectable and that cause one or more modules to execute instructions associated with the respective control to capture a first data stream that includes content from a camera configured or integrated with the user's tablet computing device. At step S106, options are provided for the user to select background image content, such as content that is stored locally on the user's computing device 102 and/or 104, or content that is available via a data communication network. One or more modules execute instructions associated with a respective selected control and to capture a second data stream, which includes the background image content.

Continuing with the example process S100 shown in FIG. 10, at step S108, telemetry information associated with the user's tablet computing device (e.g., from a gyroscope and/or accelerometer) is accessed and stored. In one or more implementations, the information is stored in a data log file, such as in XML or other suitable format. At step S110, the stored telemetry information is processed and at least a portion of the virtual background image is modified to correspond with the processed telemetry information and in association with a respective image frame in accordance with the content from the camera. At step S112, a composited video frame is generated that includes at least some of the content from the camera and at least some of the modified virtual background. At step S114, the video frame is integrated with a plurality of other video frames and output in a select format as a coordinated presentation, which is distributed in step S116, thereafter the process ends.

The present application is now further described, including with reference to FIGS. 11A-13C. In one or more implementations, implementations of the present application can be associated with videoconferencing technology, such as shown and described in commonly assigned U.S. patent application Ser. No. 15/247,534, filed Aug. 25, 2016 which, as noted above, is incorporated by reference as if set forth in its entirety herein. Incorporating green screen technology, including the new and improved green screen capabilities shown and described herein, can be particularly useful in video-conferencing technology.

In addition to addressing technical concerns as a function of the features shown and described herein, the present application provides benefits associated with maintaining at least a portion of a subject captured in a frame within a predetermined and/or specified region thereof. This can be provided, notwithstanding the subject moving around or by movement of the capture device (e.g., a camera). Subject movement and/or camera movement can contribute to the subject appearing to move in and out of the frame, which is distracting to the viewer. The present application provides a technical solution to the visual distraction caused by images of a person, e.g., person's head, that moves in and out of the frame, such as during a video-conferencing session.

In one or more implementations, the present application includes one or more modules that include code that, when executed by a processor, configures the processor to provide content within a predefined video frame shown on each of at least one display device. The module(s) configure the processor to provide the content such that the content does not appear to leave the frame, notwithstanding movement of the subject and/or capture device during capture.

For example, an area of a person's upper body (e.g., a person's head or face) is captured by a camera during a videoconference. During movement (subject and/or camera movement), the body portion is tracked and the person's face (or upper body) is maintained within a centered portion of a display screen. In one or more implementations, a graphical user interface is provided on at least one computing device that includes one or more selectable controls and/or options, e.g., cursor controls, selection controls (e.g., round, rectangular, free-form selection tools), or other suitable control. During the point of capture (or at a point before or after), the user makes a selection, such as by a single-click action, a dragged selection of a region, or the like. The selection can be used by one or more processors to define a region within the frame where particular content (e.g., a person's head or face) is to be displayed, regardless of movement. Providing controls to enable users to make specific selections within a frame increases flexibility beyond simply confining content to the center of the frame. In addition to selecting the region where content is to be displayed, a user can use one or more controls to define a particular area of the subject (e.g., a person, an animal, vehicle or virtually any movable or non-movable subject) to be displayed in a defined region within a display. For example, by clicking on and/or selecting within an area associated with the subject, one or more processors can define a respective region to be tracked and maintained within the center or other previously defined region within the display, regardless of movement. Thus, as shown and described herein, the present application provides the benefit of keeping a face (head, or shoulders, etc.) positioned (e.g., centered) in a display screen during a videoconference or other video experience, and to offset distracting movements.

In one or more implementations, confining the display of a specific area of a subject within a specific region of a display can be accomplished in various ways. For example, a capture device, such as a camera, can be configured with one or more gyroscopes that detects particular camera movement. For example, as a user inadvertently moves the capture device, the area of the subject previously defined by the user moves in and out of the frame. One or more modules executing on one or more processors track the area substantially in real time, and the images are adjusted to offset the inadvertent movement in order to maintain the positioning of the area of the subject within the frame. In one or more recommendations, a calculation can be made in order to determine the percentage of the total subject to be included in the frame (e.g., X and Y coordinates of a face within the total frame). The calculation can be used to define vertical and/or horizontal percentage values for mapping the area of the subject to be maintained in a specific region within the frame. This can be accomplished by overscanning or other similar technique to preclude the entire captured frame from being displayed in the restricted field of view of the display device. As the capture device moves, the one or more gyroscopes detect the movements and information representing the motion is received and processed by one or more processors to adjust (e.g., reposition and/or resize) the overscanned area and maintain the area of the subject in the predefined region within the frame.

In one or more implementations, a gyroscope may not be accurate enough to provide information necessary to maintain the area of the subject precisely within the defined region. Moreover, one or more image capture devices may not be configured with a gyroscope. In such (or similar) circumstances, present application can include one or more modules to provide subject stabilization. Overscanning, as described above, is supported to preclude the entire captured image from being displayed in the entire frame of the display device. For example, the captured frame is cropped and the cropped portion is modified in response to detected movement (e.g., camera movement and/or subject movement). As the person or camera moves, the image(s) can be manipulated to maintain the subject (e.g., face) in the center of the display.

Figure 11A:
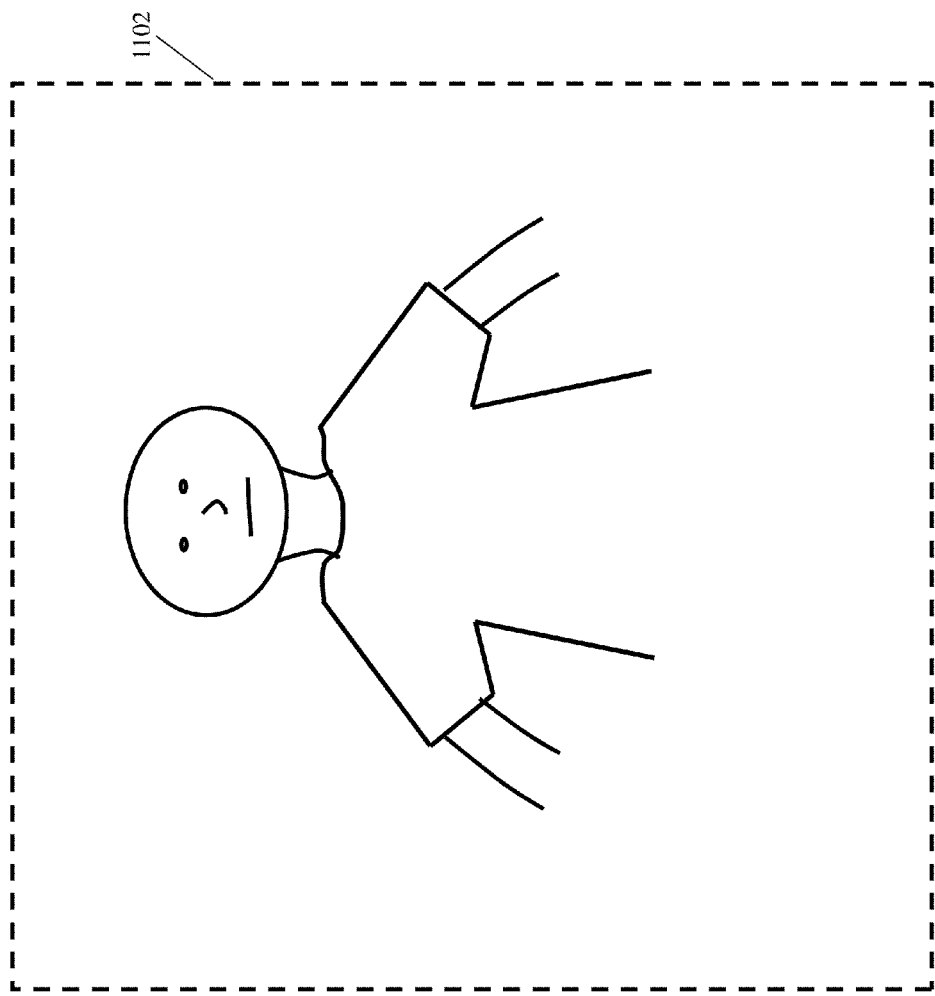
FIGS. 11A-11F illustrate a sequence and represent various features and functionality associated with the present application.
Figure 11B:
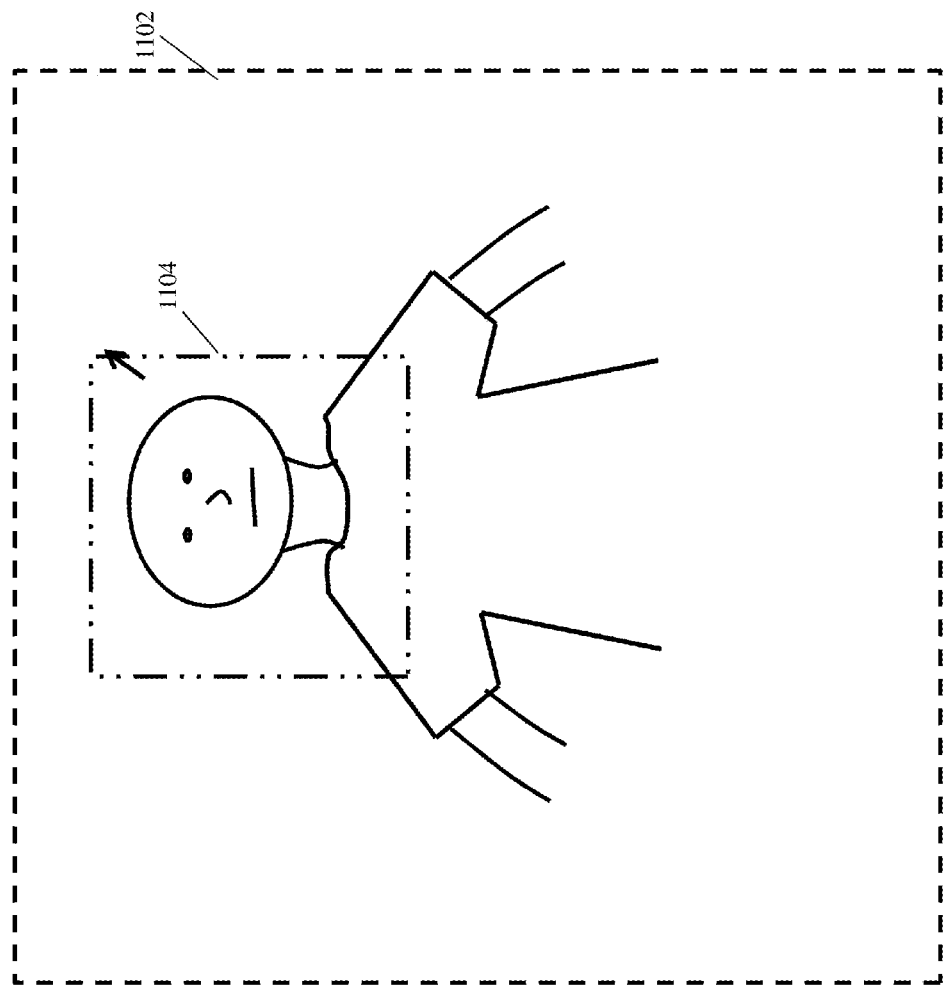

The present application is now further described with reference to FIGS. 11A-14F. FIGS. 11A-11F illustrate a sequence and represent various features and functionality associated with the present application. FIG. 11A, for example, illustrates an image of a person taking by a respective image capture device. Frame 1102 represents the boundaries of the captured image, of which the person thereof comprises a percentage. As shown and described in various implementations herein, the background portion of the image shown in FIG. 11A can be a green screen, or include a different chroma value for "green screen" functionality. In the example shown, frame 1102 represents the maximum amount of information captured by from image capture device. FIG. 11B includes a second frame 1104 that is defined by the user. Frame 1104 is usable by one or more processors to define the respective region within frame 1102 for displaying specific subject matter, such as the head of the person shown in frame 1102. In one or more implementations, any content contained within the defined frame 1104 is tracked by one more processors and displayed within frame 1104, for example during a video conferencing session.

Figure 11C:
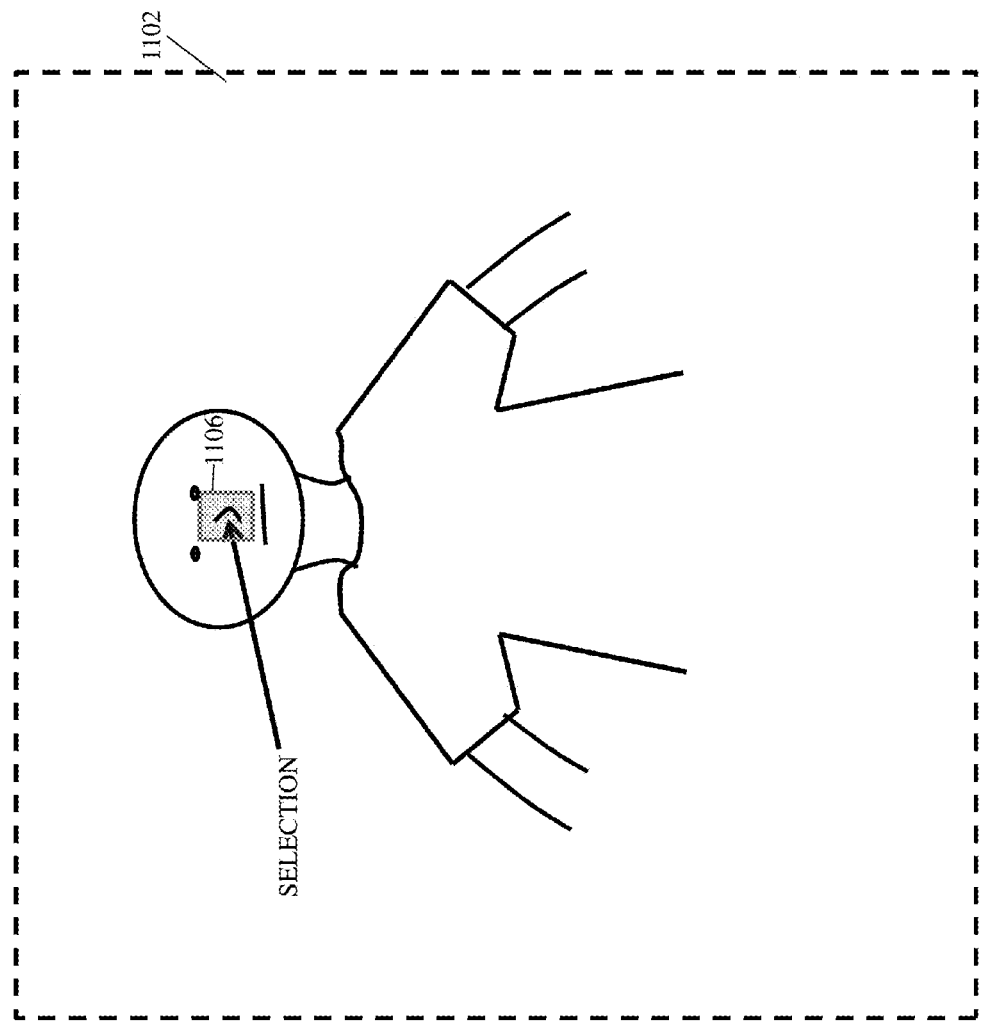

FIG. 11C illustrates another sequence of operation and/or feature associated with the present application for defining specific content to be displayed within a region of frame 1102. In the example shown in FIG. 11C, a selection 1106 is made by the user within the content illustrated in frame 1102. For example, the selection may be a click, a drawn square, or other suitable action for defining a region within frame 1102. The selection 1106 is usable to define frame 1104, and to place the selected region 1106 within the center of frame 1104.

Figure 11D:
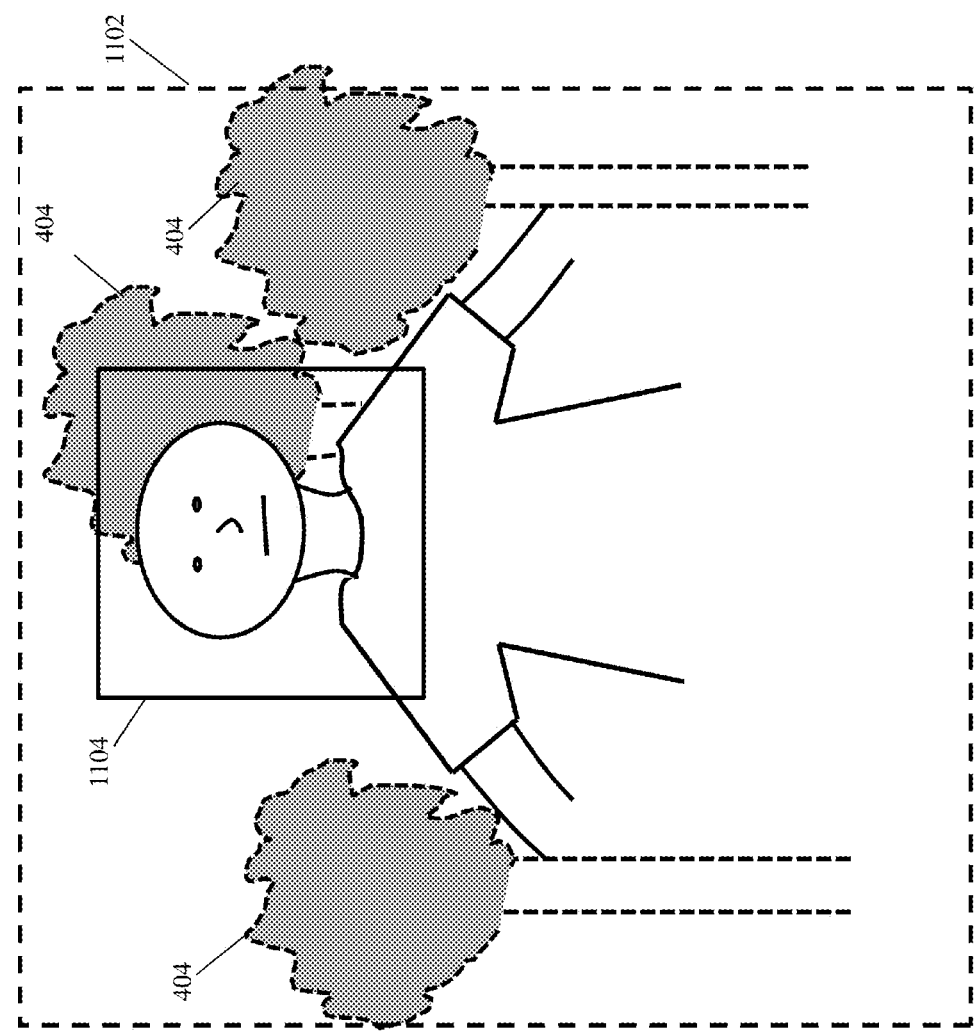
Figure 11E:
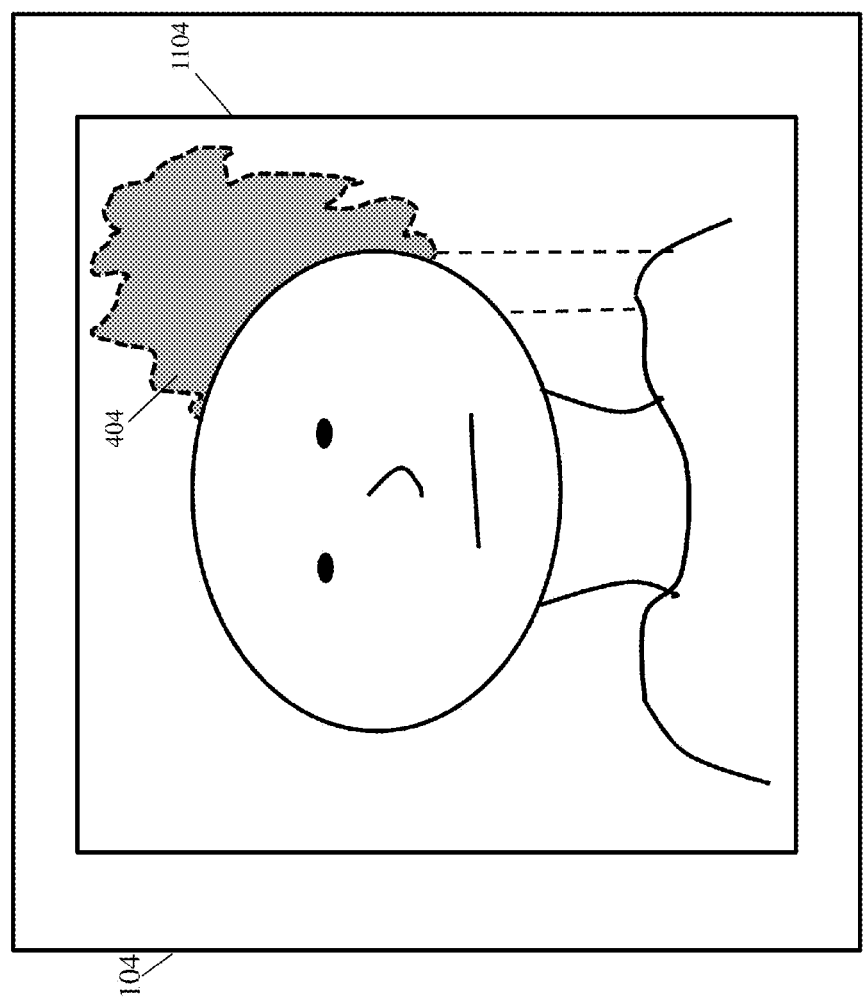
Figure 11F:
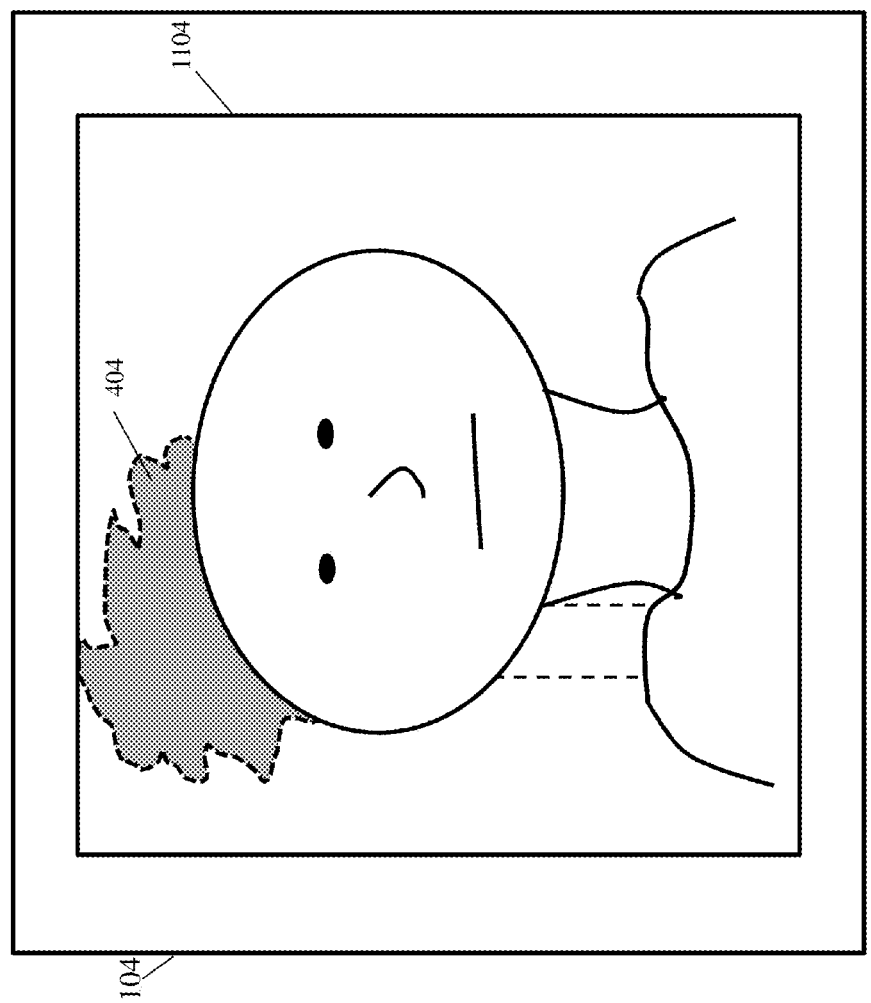

FIG. 11D illustrate an example display frame 1102 and frame 1104, such as following processes of defining a frame 1104 (FIGS. 11B and/or 11C). In addition, FIG. 11D illustrates an implementation in which green screen functionality is employed, including virtual background elements 404, represented as trees and in broken lines. This gives the appearance that the subject is located in a wooded area. FIG. 11E illustrates an example frame 1104 that is displayed on one or more user computing devices. In accordance with one or more implementations of the present application, frame 1102 is not displayed on the respective user computing devices 104, as the content therein is effectively cropped to fit frame 1104 and to maintain the respective content therein, regardless of movement. Moreover, FIG. 11E illustrates a virtual background that is illustrated within frame 1104. In one or more implementations, the virtual background can be provided in a static fashion, such that when the subject (or image capture device) moves, the virtual background does not to move in context. This is desirable in one or more contexts in which appearance of the movement of the subject is eliminated or removed as a function of tracking the subject and adjusting the position of frame 1104. In such case, the virtual background would not appear to move in context, and remain in place (such as illustrated in FIG. 11E. Alternatively, displaying movement of the subject can be desirable, notwithstanding the subject remaining within a specified region of the display (e.g., frame 1104). In such case, a dynamically changing virtual background (FIGS. 4A and 4B) can be provided within frame 1104, such as illustrated in a sequence represented in FIGS. 11E and 11F.

Figure 12A:
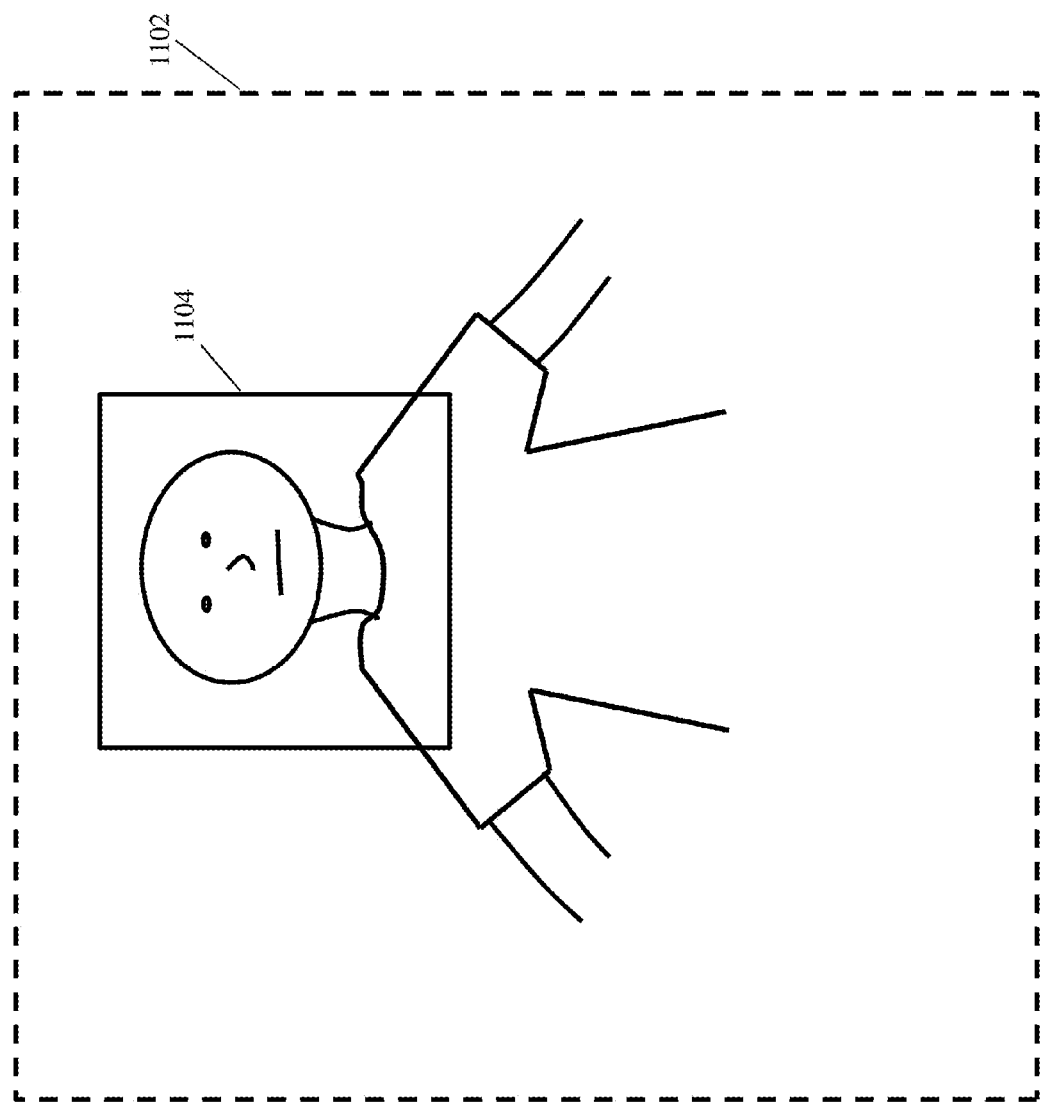
FIGS. 12A-12E illustrate an example implementation in which subject movement is tracked and content within a display frame is maintained therein, regardless of the movement.
Figure 12B:
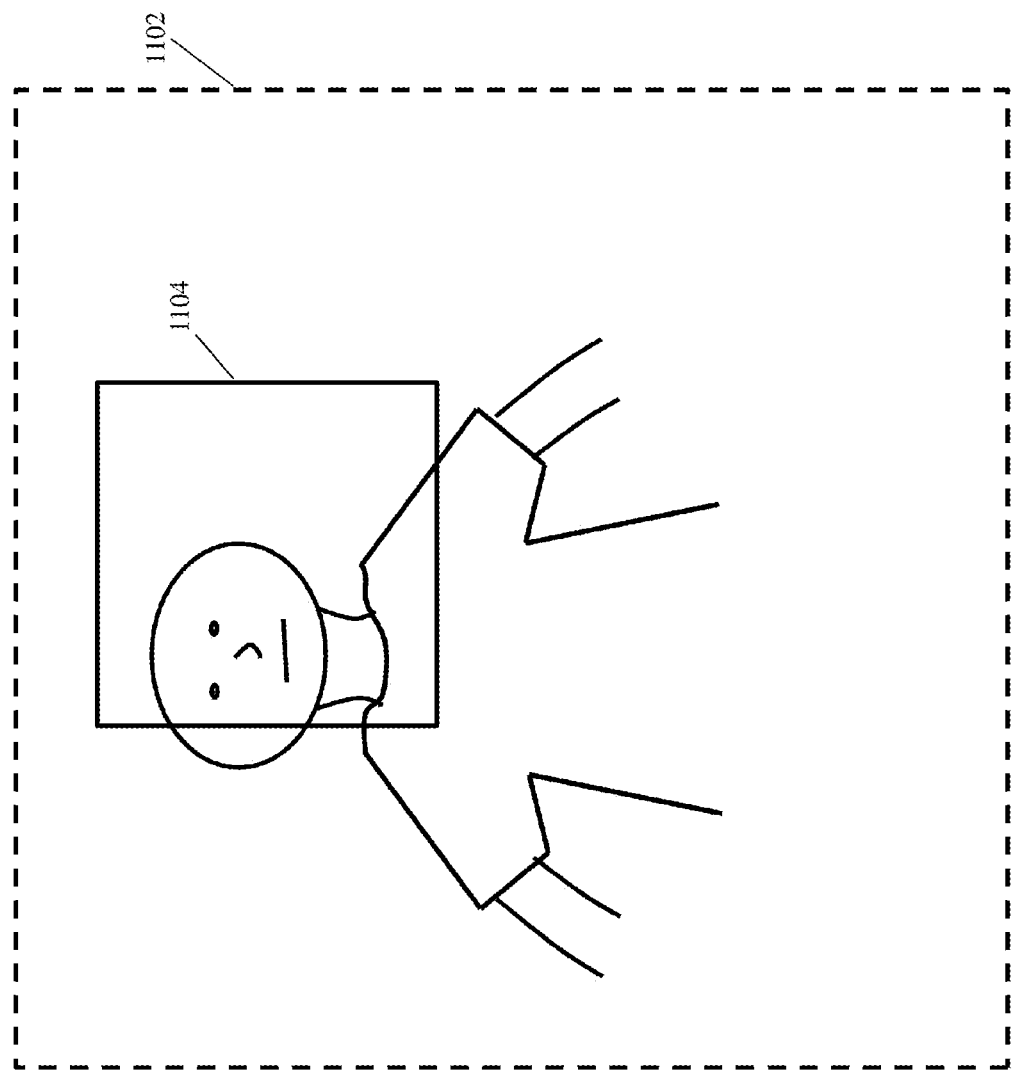
Figure 12C:
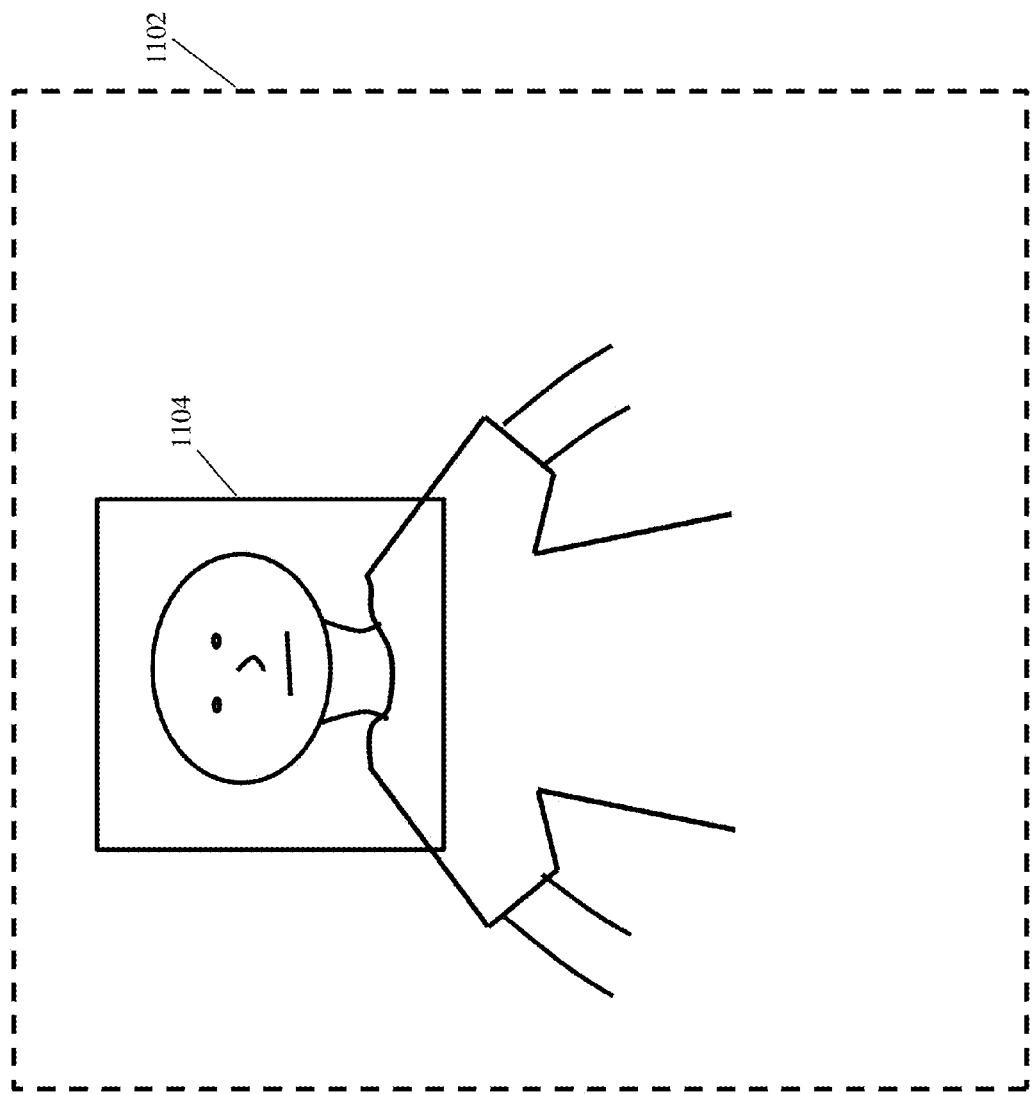
Figure 12D:
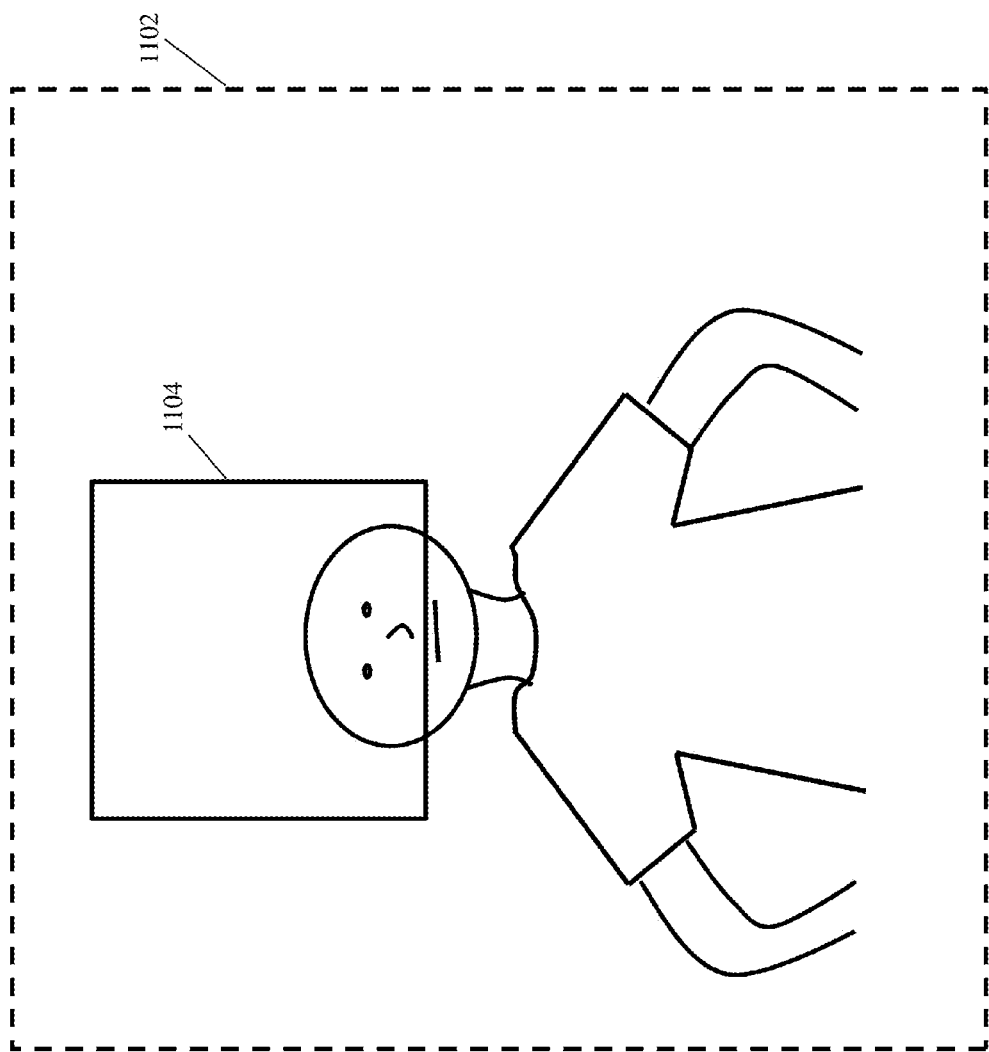
Figure 12E:
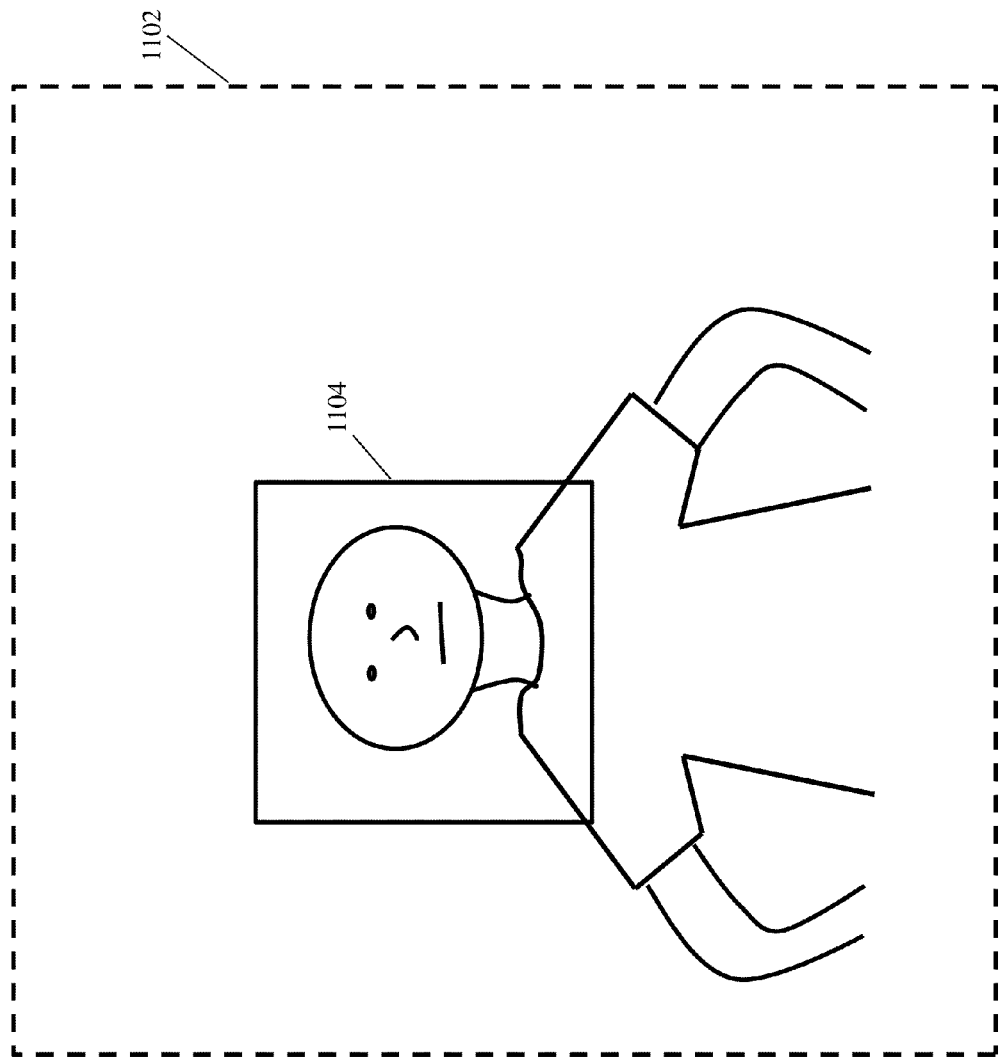

FIGS. 12A-12E illustrate an example implementation in which subject movement is tracked and content within frame 1104 is maintained therein, regardless of the movement. For example, FIG. 12A illustrates an example display frame 1102 and frame 1104, such as following processes of defining a frame 1104 (FIGS. 11B and/or 11C). During the image capture, such as during a video conferencing session, the subject moves and leaves the region defined in frame 1104 (FIG. 12B). One or more processors determines that the area of the subject has moved out of frame 1104, and the frame 1104 moves to include the area of the subject (FIG. 12C). For example, one or more algorithms can be implemented for feature recognition, which can further ensure proper centering or other placement of the subject in the display, such as within frame 1104. FIGS. 12D and 12E illustrate this a second time. In FIG. 12D, the area of the subject has moved out of frame 1104, one or more processors tracked area of the subject, and the frame 1104 relocates to include the area of the subject therein (FIG. 12E). In one or more implementations of the present application, a tracking and relocation of frame 1104 occur instantaneously, such that the viewer of a user computing device 104 does not detect that the area of the subject ever left the frame 1104 (FIG. 11E).

Figure 13A:
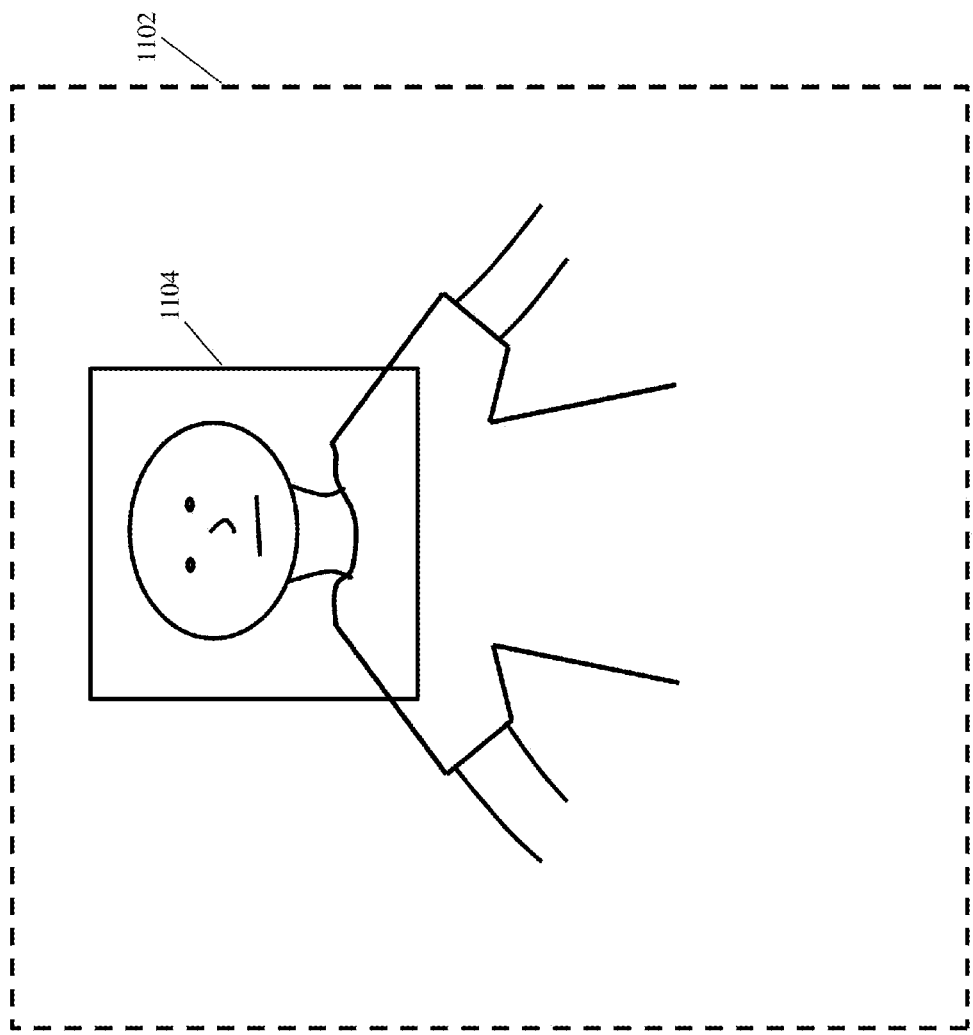
FIGS. 13A-13E illustrate an example implementation in which camera (or other) movement is tracked and content within a display frame is maintained therein, regardless of the movement.
Figure 13B:
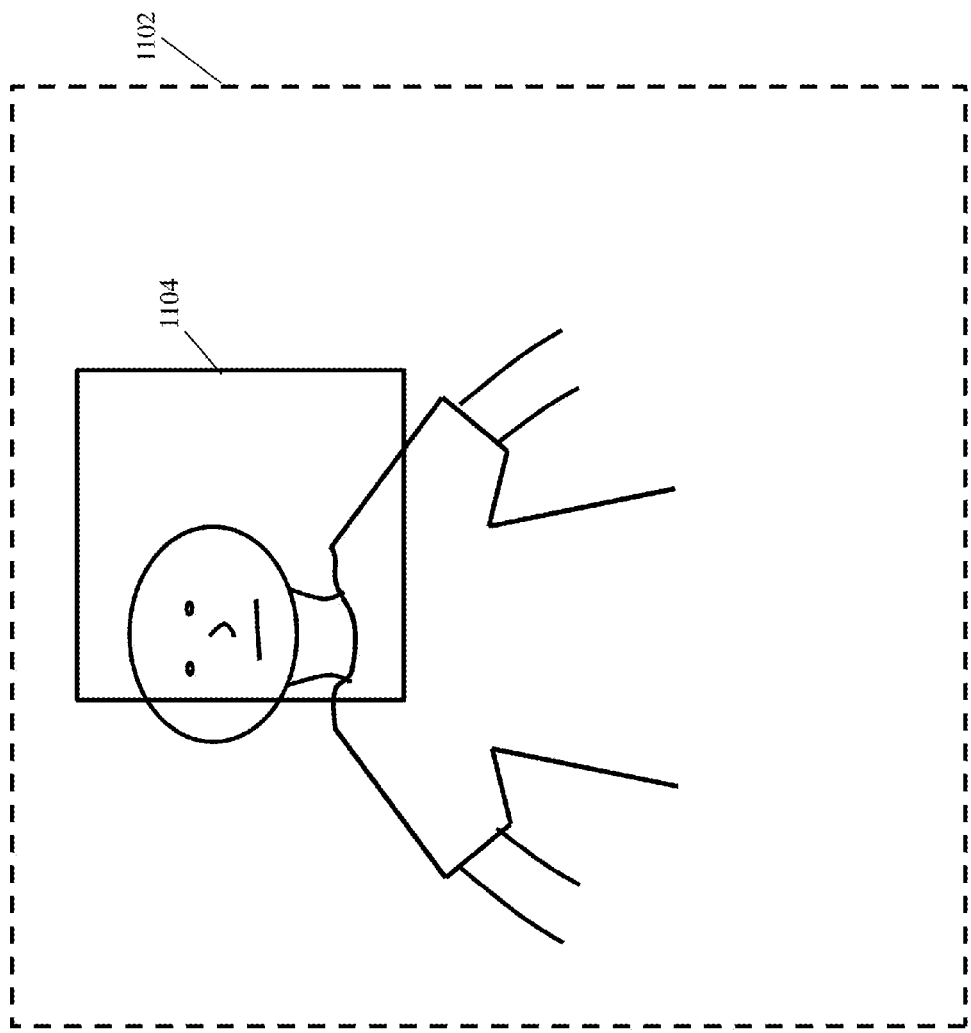
Figure 13C:
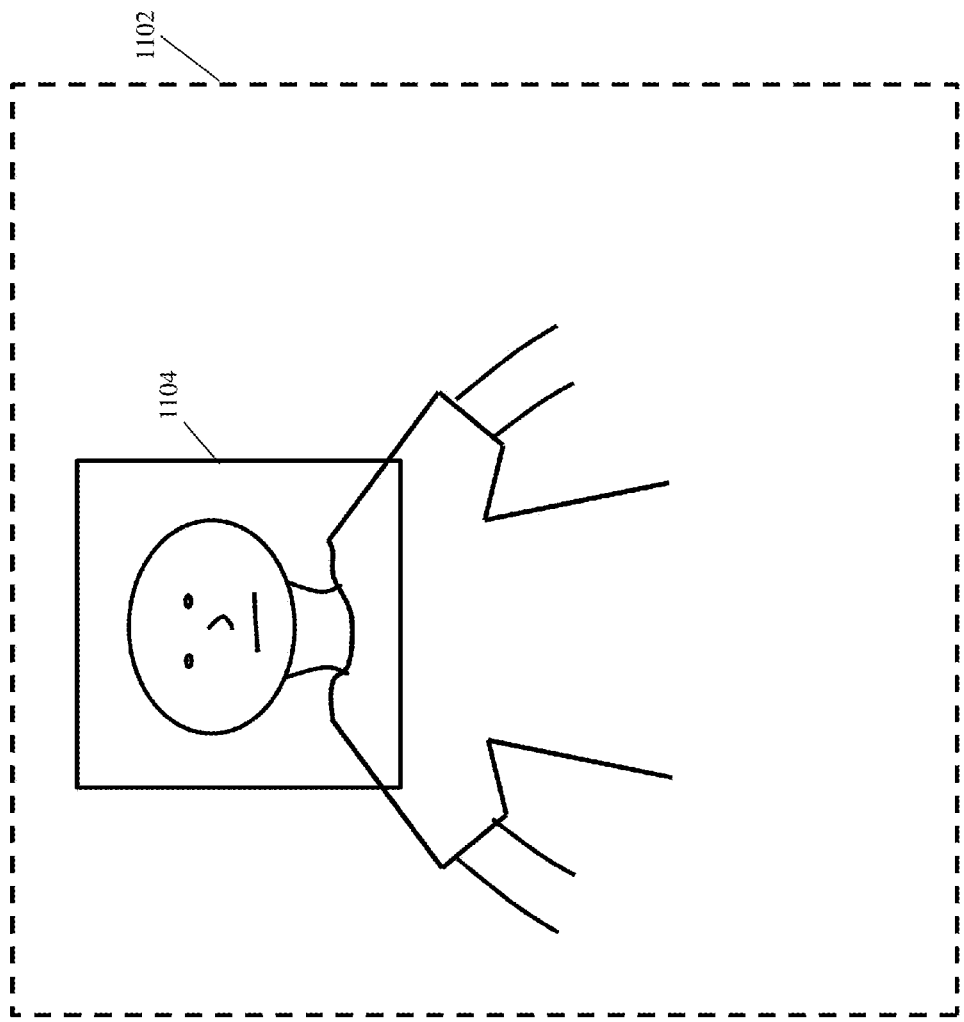
Figure 13D:
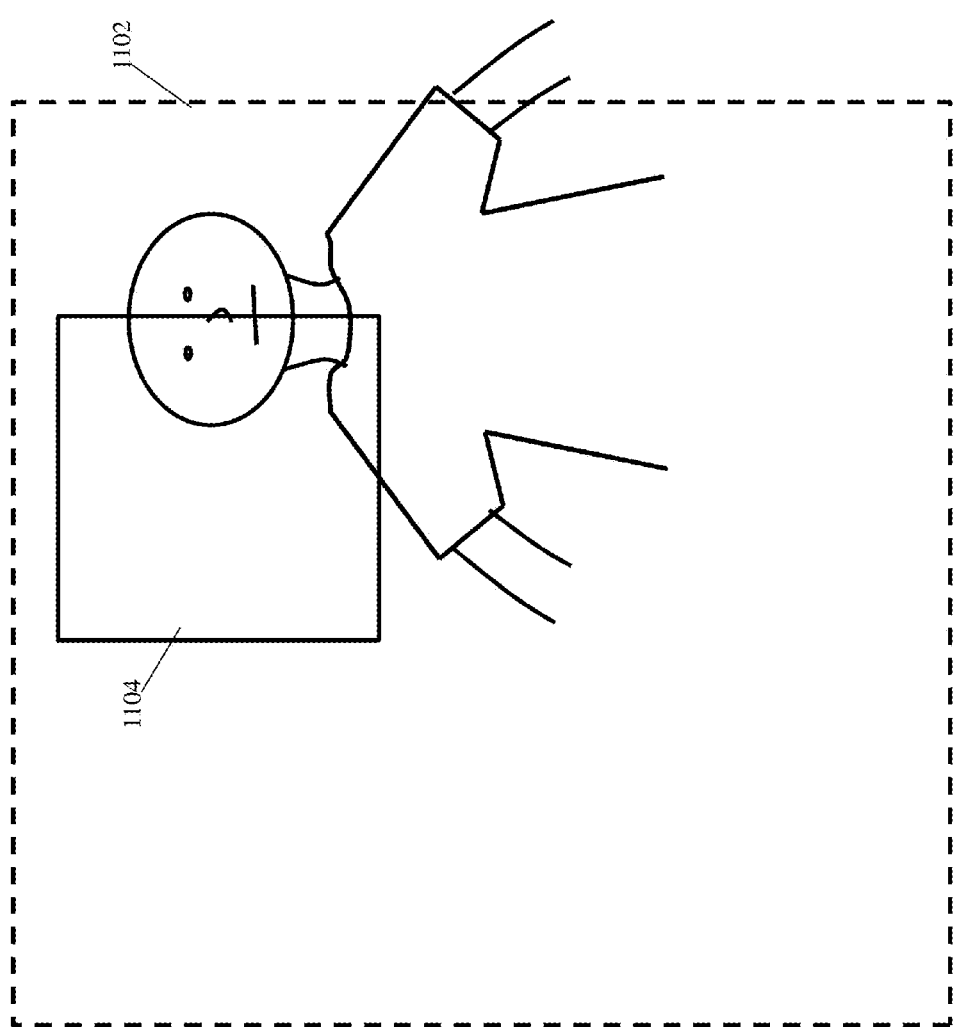
Figure 13E:
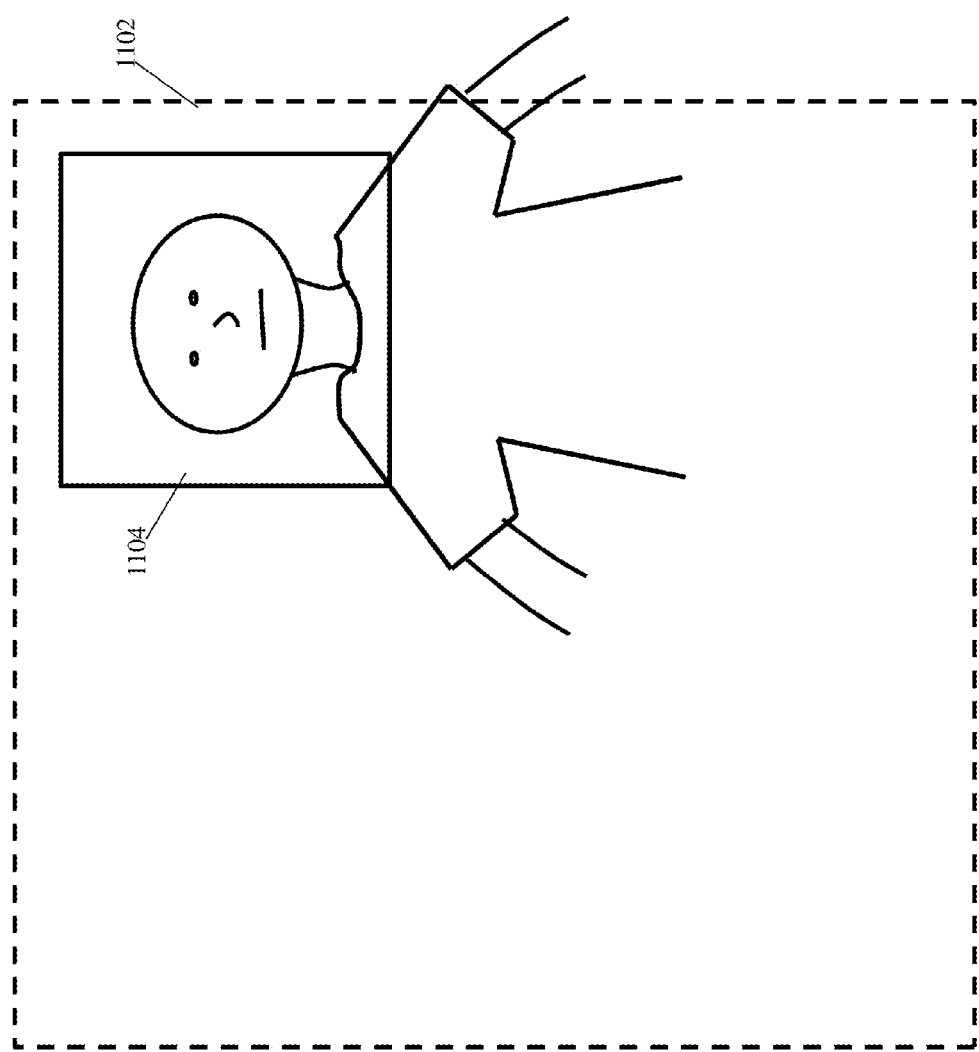

FIGS. 13A-13E illustrate an example implementation in which camera (or other image capture device) movement is tracked and content within frame 1104 is maintained therein, regardless of the movement. For example, FIG. 13A illustrates an example display frame 1102 and frame 1104, such as following processes of defining a frame 1104 (FIGS. 11B and/or 11C). During the image capture, such as during a video conferencing session, the image capture device (e.g., camera) moves and takes the area of the subject out of the region defined by frame 1104 (FIG. 13B). One or more processors determines that the area of the subject has been moved out of frame 1104, and the frame 1104 moves to include the area of the subject (FIG. 13C). FIGS. 13D and 13E illustrate this a second time. In FIG. 13D, the image capture device moves the area of the subject out of frame 1104 (and even partially out of frame 1102), and one or more processors tracked area of the subject, and the frame 1104 relocates to include the area of the subject therein (FIG. 13E). In one or more implementations of the present application, a tracking of the area of the subject and relocation of frame 1104 occur instantaneously, such that the viewer of a user computing device 104 does not visually detect that the respective area of the subject ever left the frame 1104 (FIG. 11E).

Figure 14A:
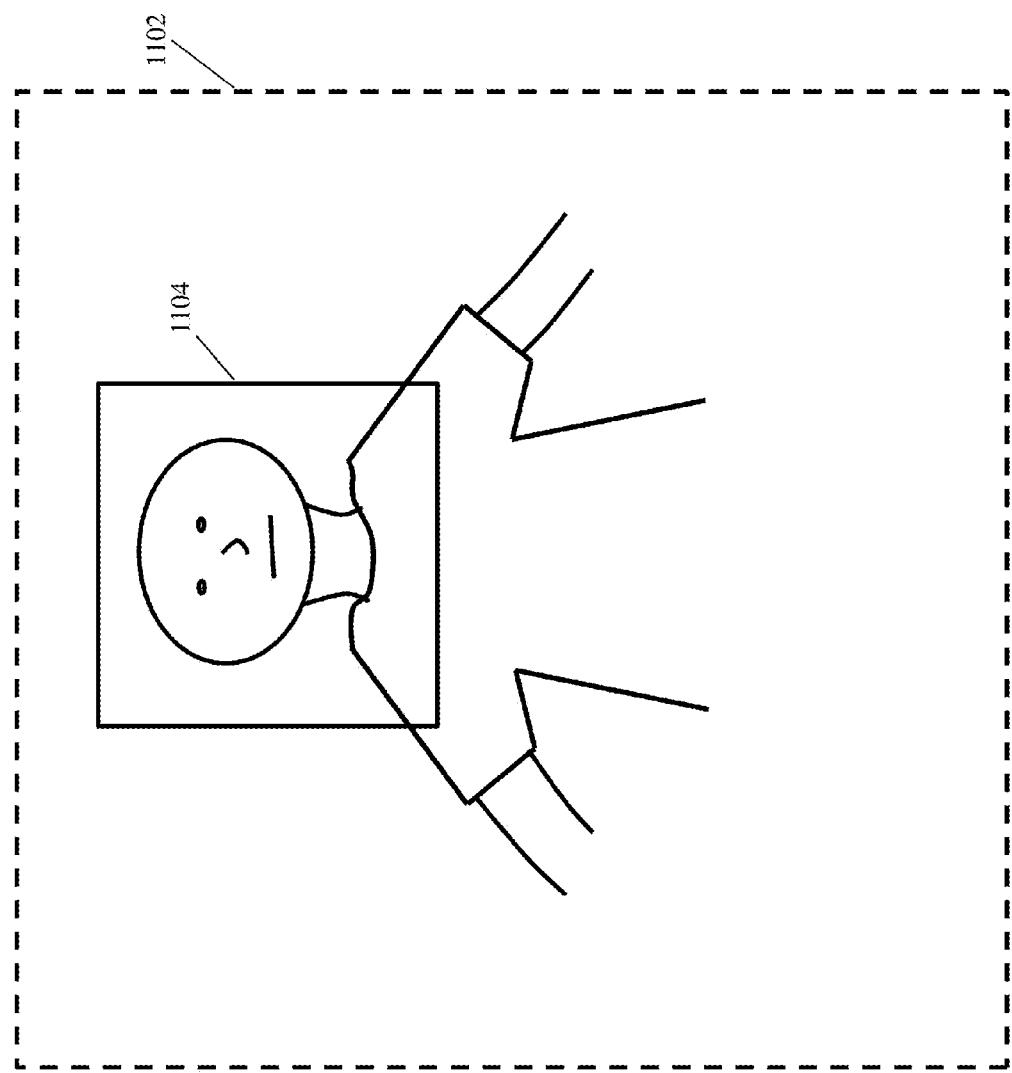
FIGS. 14A-14C illustrates an example implementation in which subject movement is tracked and focus of content within a display frame is maintained therein, regardless of the movement.
Figure 14B:
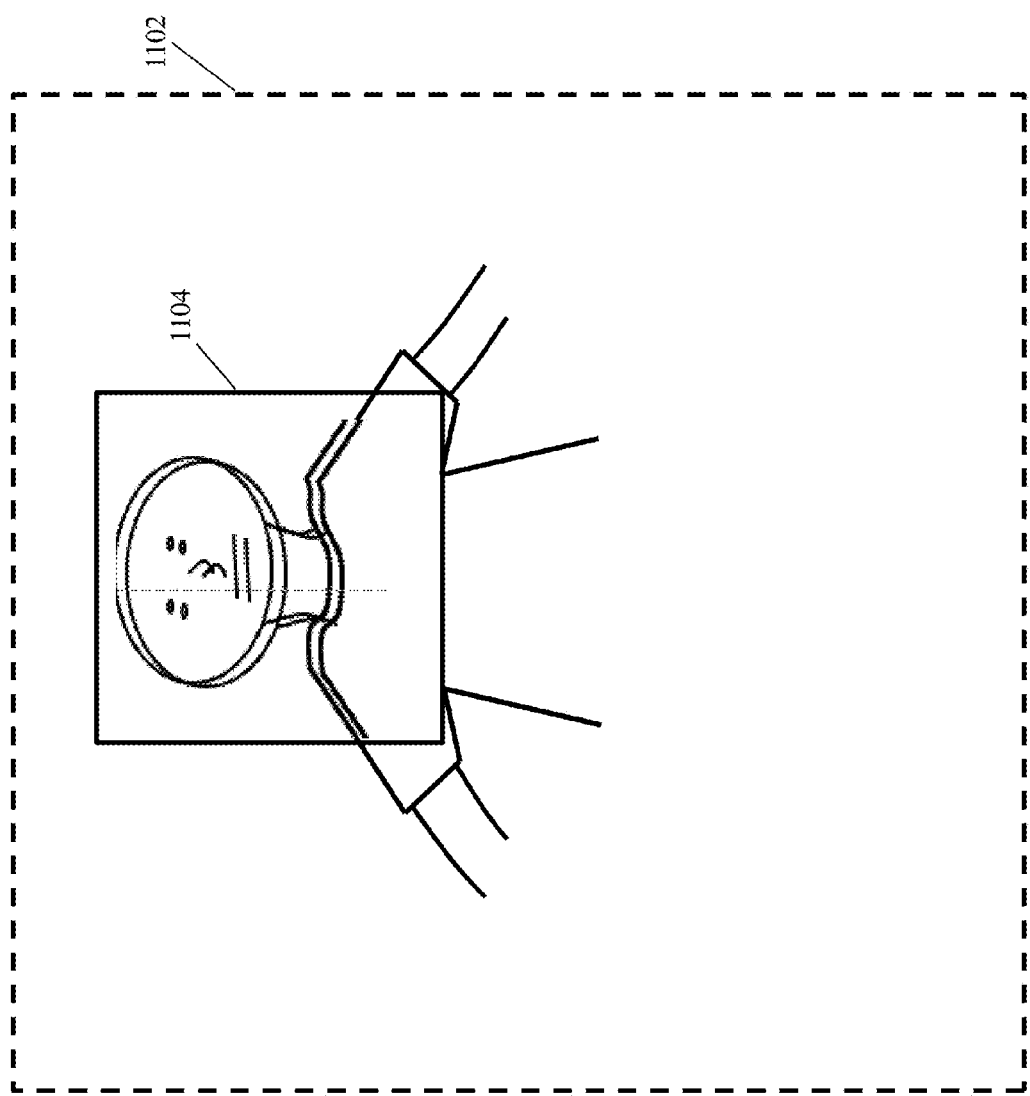
Figure 14C:
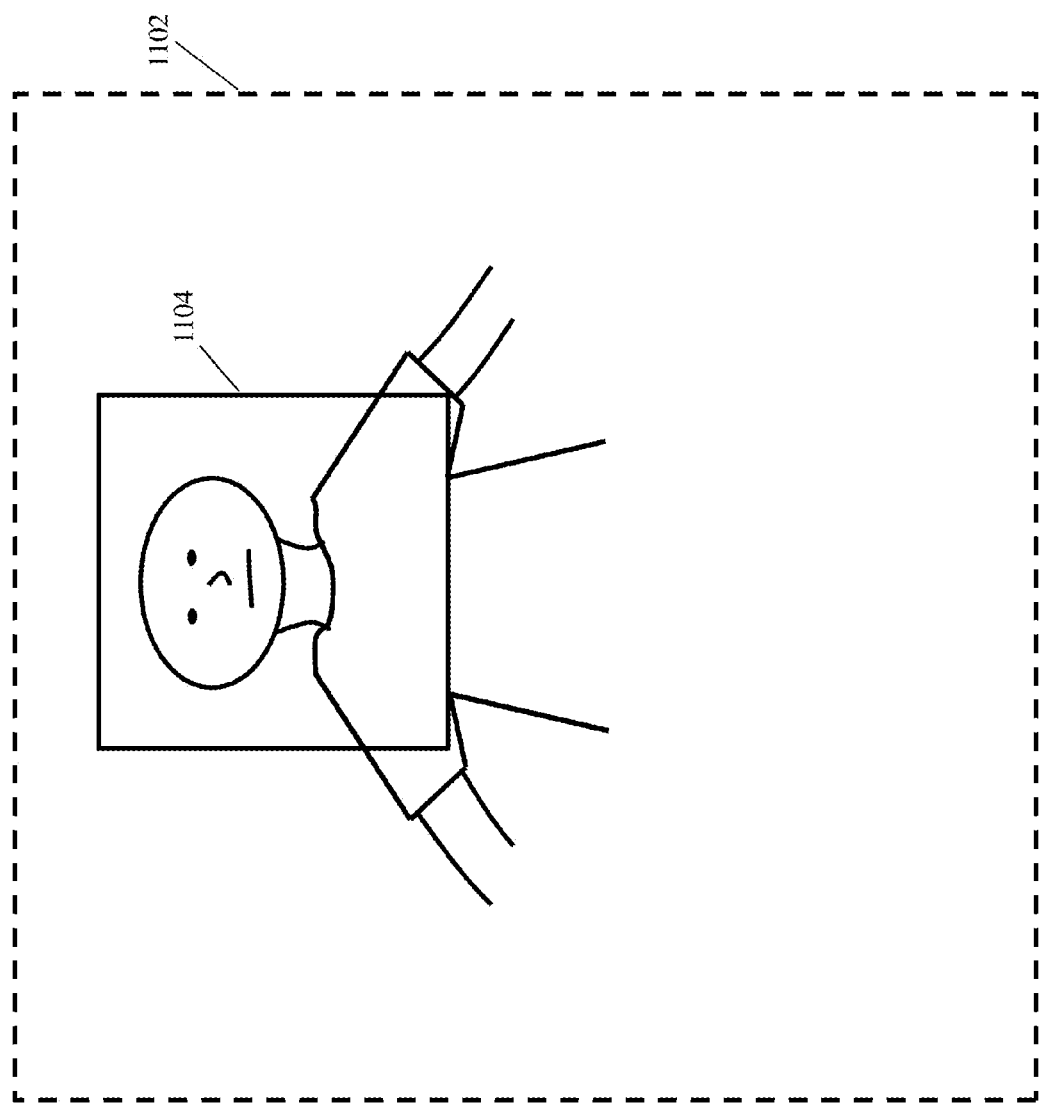

In addition to maintaining an area of a subject within a respective frame 1104, the present application can be configured to determine that a subject or an area thereof has either moved from a respective position and/or an image capture device has moved from a respective position, thereby causing the area of the subject to be out of focus. For example, FIG. 14A illustrates an example display frame 1102 and frame 1104, such as following processes of defining a frame 1104 (FIGS. 11B and/or 11C). During the image capture, such as during a video conferencing session, the subject moves and by moving out of a respective focal plane, the subject appears blurry (FIG. 14B). A determination is made, such as in accordance with a selected portion of the subject (FIG. 11C), that a portion of the subject is not sharply in focus, and an adjustment is made to bring the subject back into focus (FIG. 14C). In one or more implementations, this can be accomplished by causing one or more instructions to an autofocus module configured with image capture device, to bring the subject back into focus. Alternatively, a bracket or mount can be provided that is configured to hold the image capture device and to actuate in response to a determination that the subject is out of focus, make subtle movements to bring the area of the subject (e.g., within frame 1104) back into focus.

Turning now to FIG. 15, a flow diagram is described showing a routine S200 that illustrates a broad aspect of a method for authoring a coordinated presentation in accordance with at least one implementation disclosed herein. At step S202, the process starts, for the example, as an app launching on a tablet computing device. At step S204, options in the form of graphical screen controls are provided to a user for authoring a coordinated presentation, for example, in the form of camera controls, which are selectable and that cause one or more modules to execute instructions associated with the respective control to capture a first data stream that includes content from a camera configured or integrated with the user's tablet computing device. At step S206, options are provided for the user to select background image content, such as content that is stored locally on the user's computing device 102 and/or 104, or content that is available via a data communication network. One or more modules execute instructions associated with a respective selected control and to capture a second data stream, which includes the background image content.

Continuing with the example process S200 shown in FIG. 15, at step S208, a region is defined within a display for a respective portion or area of a subject. At step S210, movement of the portion of the subject is tracked. At step S212, the moved portion of the subject in the region, and at step S214, a video frame is integrated with a plurality of other video frames and output in a select format as a coordinated presentation, which is distributed. Thereafter the process ends.

Thus, as shown and described herein, technology is provided for extending green screen functionality, including to separate a subject from the background while simultaneously maintaining the appearance of the subject within a respective region within a display screen, notwithstanding subject and/or camera movement. The present application provides significant flexibility and creativity in connection with creating and viewing coordinated presentations. Although many of the examples shown and described herein regard distribution of coordinated presentations to a plurality of users, the invention is not so limited. Although illustrated embodiments of the present invention have been shown and described, it should be understood that various changes, substitutions, and alterations can be made by one of ordinary skill in the art without departing from the scope of the present invention.

What is claimed is:

1. A system for generating a coordinated presentation, comprising:
   a computing device having a processor and a memory, the computing device being configured by code stored in the memory and executed by the processor to:
   curate content selected by a user for inclusion in the coordinated presentation;
   capture, at least via an image capture device, a plurality of images for inclusion in the coordinated presentation;
   receive a first data stream associated with the curated content and a second data stream associated with the captured images;
   define a portion of a subject within each of the plurality of images in the second data stream, wherein the portion comprises less than any one image;

track an appearance of movement of the portion of the subject within each of the plurality of images;

modify, as a function of the tracked appearance of movement, at least some of the plurality of images in the second data stream by displaying the portion in a single position; and integrate respective content associated with the two data streams, including the modified at least some of the plurality of images, to generate the coordinated presentation that is capable of transmission to and receipt by one or more remote devices, and wherein the coordinated presentation is configured to enable interaction with at least a portion of the curated content at each of the one or more remote devices.

2. The system of claim 1, wherein the computing device is further configured by code stored in the memory and executed by the processor to:

process telemetry information associated with at least one of a gyroscope and accelerometer, wherein the tracked appearance of movement is based on the telemetry information.

3. The system of claim 2, wherein the telemetry information represents computing device movement associated with distance, speed and direction in at least one of an X-axis, a Y-axis and a Z-axis.

4. The system of claim 2, wherein the computing device is further configured by code stored in the memory and executed by the processor to alter placement and/or alter an angle of view of the at least some of the content in the first data stream.

5. The system of claim 2, wherein the curated content includes a 360 degree horizontal view and a 180 degree vertical view, and wherein the computing device is further configured by code stored in the memory and executed by the processor to:

control an angle, distance and/or viewpoint appearance of content in the first stream of data as a function of the telemetry information.

6. The system of claim 1, wherein the computing device is further configured by code stored in the memory and executed by the processor to:

alter appearance of content in the second data stream, including position in a frame of the coordinated presentation as a function of input received in an authoring tool interface.

7. The system of claim 1, wherein the computing device is further configured by code stored in the memory and executed by the processor to:

substitute a portion content in of the second data stream with at least a portion of content in the first data stream as a function of at least a chroma value appearing in the content in the second data stream.

8. The system of claim 1, wherein the angle, distance and/or viewpoint of content in the first stream of data are is controlled by adjusting the first stream of data to correspond oppositely to appearance of content in the second data stream.

9. The system of claim 1, wherein the curated content includes web-based content and wherein the computing device is further configured by code stored in the memory and executed by the processor to:

position content associated with second data stream to appear virtually integrated into the first data stream.

10. The system of claim 1, wherein the step of modifying at least some of the curated content includes changing perspective, skew, brightness, contrast and/or saturation.

11. A method for generating a coordinated presentation, comprising:

curating, by a computing device being configured by code stored in a memory and executed by a processor, content selected by a user for inclusion in the coordinated presentation;

capturing, at least via a camera, a plurality of images for inclusion in the coordinated presentation; capture, at least via an image capture device, a plurality of images for inclusion in the coordinated presentation;

receiving, by the computing device, a first data stream associated with the curated content and a second data stream associated with the captured images;

defining, by the computing device, a portion of a subject within each of the plurality of images in the second data stream, wherein the portion comprises less than any one image;

tracking, by the computing device, an appearance of movement of the portion of the subject within each of the plurality of images;

modifying, by the computing device as a function of the tracked appearance of movement, at least some of the plurality of images in the second data stream by displaying the portion in a single position; and integrating, by the computing device, respective content associated with the two data streams, including the modified at least some of the plurality of images, to generate the coordinated presentation that is capable of transmission to and receipt by one or more remote devices, and wherein the coordinated presentation is configured to enable interaction with at least a portion of the curated content at each of the one or more remote devices.

12. The method of claim 11, further comprising:

processing, by the computing device, telemetry information associated with at least one of a gyroscope and accelerometer, wherein the tracked appearance of movement is based on the telemetry information.

13. The method of claim 12, wherein the telemetry information represents computing device movement associated with distance, speed and direction in at least one of an X-axis, a Y-axis and a Z-axis.

14. The method of claim 12, further comprising:

altering, by the computing device, placement and/or alter an angle of view of the at least some of the content in the first data stream.

15. The method of claim 12, wherein the curated content includes a 360 degree horizontal view and a 180 degree vertical view, and further comprising:

controlling, by the computing device, an angle, distance and/or viewpoint appearance of content in the first stream of data as a function of the telemetry information.

16. The method of claim 11, further comprising:

altering, by the computing device, appearance of content in the second data stream, including position in a frame of the coordinated presentation as a function of input received in an authoring tool interface.

17. The method of claim 11, further comprising:

substituting, by the computing device, a portion content in of the second data stream with at least a portion of content in the first data stream as a function of at least a chroma value appearing in the content in the second data stream.

18. The method of claim 11, wherein the angle, distance and/or viewpoint of content in the first stream of data are is controlled by adjusting the first stream of data to correspond oppositely to appearance of content in the second data stream.

19. The method of claim 11, wherein the curated content includes web-based content and, further comprising:
  positioning, by the computing device, content associated with second data stream to appear virtually integrated into the first data stream.

20. The method of claim 11, wherein the step of modifying at least some of the curated content includes changing perspective, skew, brightness, contrast and/or saturation.

\* \* \* \* \*

UNITED STATES PATENT AND TRADEMARK OFFICE
CERTIFICATE OF CORRECTION

PATENT NO. : 9,852,764 B2
APPLICATION NO. : 15/608932
DATED : December 26, 2017
INVENTOR(S) : Edo Segal and Dmytro Panin Page 1 of 1

It is certified that error appears in the above-identified patent and that said Letters Patent is hereby corrected as shown below:

Column 20, Lines 8-10:
The text "capture, at least via an image capture device, a plurality of images for inclusion in the coordinated presentation;" should be deleted.

Signed and Sealed this
Tenth Day of July, 2018

Andrei Iancu
*Director of the United States Patent and Trademark Office*